(12) United States Patent
Kurahashi et al.

(10) Patent No.: US 6,339,447 B1
(45) Date of Patent: Jan. 15, 2002

(54) IMAGE SENSING APPARATUS

(75) Inventors: Sunao Kurahashi, Kawasaki; Kazuhiko Etoh; Shigeo Ogura, both of Tokyo; Makoto Sekita, Yokohama; Nobuhiro Takeda; Kenji Takahashi, both of Kawasaki, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/608,690

(22) Filed: Feb. 29, 1996

(30) Foreign Application Priority Data

| Mar. 3, 1995 | (JP) | 7-044057 |
| May 12, 1995 | (JP) | 7-137504 |
| May 12, 1995 | (JP) | 7-137505 |
| Jun. 1, 1995 | (JP) | 7-170464 |

(51) Int. Cl.[7] ............................................. H04N 5/253
(52) U.S. Cl. ..................... 348/96; 348/333.06; 348/373; 396/348; 396/429; 396/535
(58) Field of Search ............................. 348/96, 370, 98, 348/371, 373, 376, 838, 333, 358, 333.06, 14.01; 358/475, 479; 396/155, 164, 199, 429, 348, 535; 345/82, 102; 361/681, 683; 222/325, 52, 333; 399/1, 131

(56) References Cited

U.S. PATENT DOCUMENTS

| 3,803,350 A | * | 4/1974 | Lemelson | 358/479 |
| 5,075,182 A | * | 12/1991 | Weber | 429/122 |
| 5,218,439 A | * | 6/1993 | Mizoguchi et al. | 358/209 |
| 5,559,554 A | * | 9/1996 | Uekane et al. | 348/333 |
| 5,612,732 A | * | 3/1997 | Yuyama et al. | 348/14 |
| 5,638,115 A | * | 6/1997 | Imai | 348/98 |
| 5,836,482 A | * | 11/1998 | Ophardt et al. | 222/325 |

FOREIGN PATENT DOCUMENTS

| JP | 5-153448 | * | 6/1993 | H04N/5/225 |
| JP | 40553448 | * | 6/1993 | H04N/5/225 |

* cited by examiner

Primary Examiner—Thai Tran
Assistant Examiner—Christopher Onuaku
(74) Attorney, Agent, or Firm—Morgan & Finnegan, LLP

(57) ABSTRACT

An image sensing apparatus has an image sensing unit and a display unit. The image sensing unit has an optical system for photographing an object and an image sensing element. The display unit has a liquid crystal display device for performing an image display on the basis of a video output from the image sensing unit. A film fixing unit holds the image sensing unit and the display unit at a predetermined distance and also forms a mounting unit for mounting the object on the display surface of the display unit. A film holder for holding a film as an object is mounted on the mounting unit, and a film photographing operation is performed by the image sensing unit while using the display unit as an illumination device.

11 Claims, 20 Drawing Sheets

F I G. 19
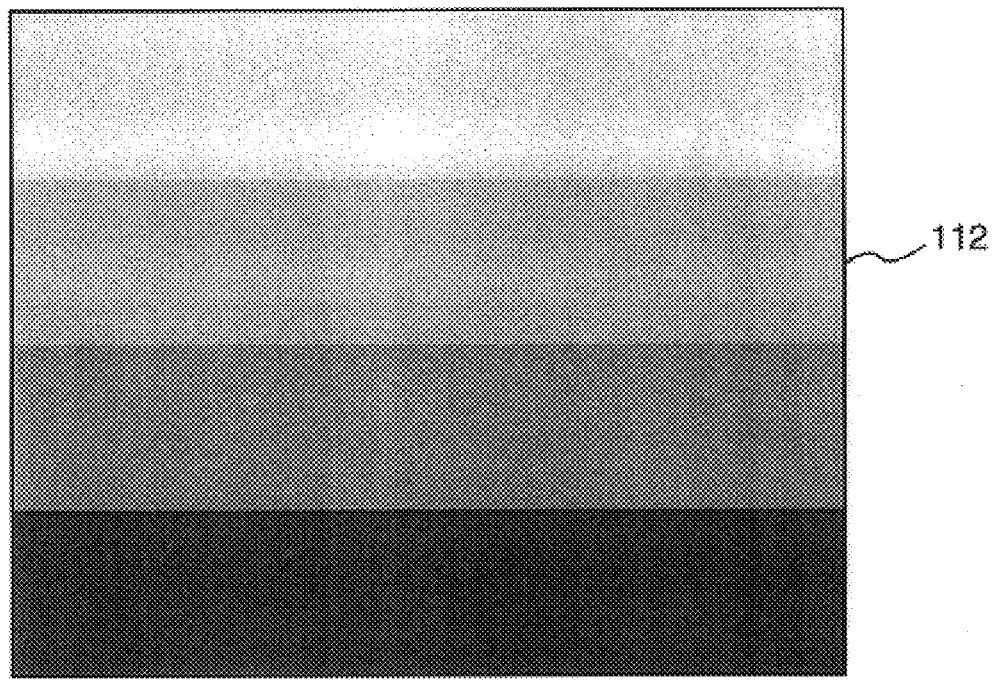

IMAGE SENSING APPARATUS

BACKGROUND OF THE INVENTION

The present invention relates to an image sensing apparatus having an image sensing unit and a display unit for reproducing a video output from this image sensing unit.

In the field of cameras, video cameras are recently popular. With a video camera, photographed image information of a dynamic or still image can be recorded on a recording medium, e.g., a magnetic recording medium such as a video tape or a video floppy, or a solid-state memory such as a memory card without performing a development process, unlike a silver halide camera. Additionally, image information which is being photographed or already recorded on a recording medium can be immediately reproduced on a television monitor or the like. Furthermore, along with the recent progress in technology, compact and light weight video cameras become popular, allowing long-time use in outdoors.

Using the above features, video cameras having a compact (3 to 4 inches) liquid crystal display unit combined with a camera, which is used as a view finder in the photographing operation or a reproducing device for reproducing a recorded image, are also widely used because of convenience. On the other hand, apparatuses dedicated to reproduce negative (positive) film image information on a television monitor or convert film image information into an electrical signal and print it by a video printer, or adapters for allowing a photographing operation using a negative (positive) film by a video camera while fixing the film in front of the photographing lens of the video camera are also available.

These apparatuses generally have an illumination unit in addition to a holding unit for holding a photographing lens and an object (film) at a predetermined distance or a mounting unit for mounting the object. By illuminating the film from the back with uniform light obtained by this illumination unit, the photographing operation can be satisfactorily performed. The illumination unit is constituted by a light-emitting unit using a cold cathode-ray tube or the like, an inverter circuit unit for supplying power to the light-emitting unit, a diffusion unit for diffusing light from the light-emitting unit to obtain almost uniform light, and the like.

However, to satisfactorily perform the photographing operation by using such a conventional apparatus, the film must be illuminated, as described above. A special illumination unit is required for this purpose, resulting in an economical disadvantage for the user.

In this case, the following problem is posed due to the influence of a decrease in peripheral light amount of the photographing lens. When an object with a uniform luminance distribution is photographed, the peripheral portion becomes dark as indicated by a solid line in FIG. 3 due to a decrease in peripheral light amount of the photographing lens. Normally, this phenomenon is not so conspicuous. However, in negative-positive reversal, the central portion becomes dark as indicated by a solid line in FIG. 4, resulting in an unnatural image.

Some conventional video recording apparatuses called electronic still cameras or video movie cameras can reproduce photographed video information on a display unit arranged integrally with a camera.

FIG. 24 is a view schematically showing a conventional information recording/reproducing apparatus. Reference numeral 1000 denotes a camera body; 1010, a display unit arranged on the rear surface of the camera body 1000; and 1020, a grip with which the user holds the camera body 1000. The user can observe an object image on the display unit 1010 during or after the photographing operation.

Generally, a liquid crystal display element is used for the display unit 1010. In a liquid crystal display element, however, the allowance of an angle (angle of field) with respect to the line of sight for obtaining a satisfactory image is small. Therefore, to obtain an angle of field for obtaining a satisfactory view of the display unit 1010 while setting the camera body 1000 toward an object in the photographing operation, the user must take a forced posture.

The expensive liquid crystal display element used for the display unit 1010 may be damaged because it is always exposed in use and unused states.

An electronic still camera or a video movie camera as a photographing unit is often used in outdoors. Therefore, when the display unit 1010 is irradiated with a sun beam or the like, it is difficult to satisfactorily view an image reproduced on the display unit 1010.

In the arrangement shown in FIG. 24, the grip 1020 for holding the camera body 1000 is arranged at one end of the camera body 1000. This arrangement causes a moment to act on a hand holding the camera body 1000, resulting in a large load on the user during a long-time photographing operation.

In addition, since a large grasping force is necessary to hold the camera body, it is difficult to operate the release button and the like of the camera with the hand holding the camera body 1000.

SUMMARY OF THE INVENTION

The present invention has been made in consideration of the above problems, and has as its object to provide an image sensing apparatus having an image sensing means and a display means for performing a display on the basis of a video output from the image sensing means, which can illuminate an object by using the display means in a photographing operation and reduces an economical load on a user.

It is another object of the present invention to provide an image sensing apparatus capable of photographing an object such as a film without using any dedicated illumination means.

It is still another object of the present invention to provide an image sensing apparatus capable of obtaining an appropriate image while preventing the central portion of the image from becoming dark even in negative-positive reversal without using a special illumination device.

It is still another object of the present invention to provide an image sensing apparatus which can correct a color developed when display means is used as illumination means, thereby easily realizing desired color temperature conversion.

It is still another object of the present invention to provide an image sensing apparatus which can correct a color developed when display means is used as illumination means, thereby removing a desired color component.

It is still another object of the present invention to provide an image sensing apparatus which can detect the luminance distribution of light transmitted through a photographing lens and correct the luminance distribution of illumination light emitted from display means on the basis of the detected luminance distribution, thereby achieving appropriate luminance distribution correction.

It is still another object of the present invention to provide an image sensing apparatus which does not force a user holding the apparatus in an unnatural posture and does not tire the user even in long-time use.

It is still another object of the present invention to provide an image sensing apparatus having an easily operable release button and the like.

It is still another object of the present invention to provide an image sensing apparatus capable of satisfactorily observing display contents on display means.

It is still another object of the present invention to provide an image sensing apparatus which can adjust the positional relationship between photographing means and display means, thereby allowing satisfactory observation of display contents on the display means in a photographing operation.

It is still another object of the present invention to provide an image sensing apparatus which can protect the display surface of display means in an unused state.

It is still another object of the present invention to provide an image sensing apparatus which can easily photograph a sheet-like object such as a film.

It is still another object of the present invention to provide a compact image sensing apparatus.

It is still another object of the present invention to provide an image sensing apparatus which allows a user to satisfactorily observe display contents on display means even when the apparatus is used on a table.

It is still another object of the present invention to provide an image sensing apparatus which can further easily clearly photograph a sheet-like object such as a film.

It is still another object of the present invention to provide an image sensing apparatus which can photograph both an object in front of an image sensing unit and another object behind the image sensing unit.

It is still another object of the present invention to provide an image sensing apparatus which can prevent a power supply from being kept on in an unused state.

In order to achieve at least one of the above objects of the present invention, according to one aspect of the present invention, there is provided an image sensing apparatus which photographs an object by image sensing means having an optical system and an image sensing element and displays a video output on standard display means, in which the display device of the display means can be used to illuminate the object as a photographing target.

For example, using a liquid crystal display device having a light-emitting element (e.g., a backlight consisting of a cold cathode-ray tube) on its rear surface, or a light emission type CRT, a white color can be displayed on the display device which is usable as a surface emission type illumination source.

With this arrangement, when the display color and luminance of the display device are appropriately set, the display means can be used as an illumination lamp without using any additional illumination lamp. Therefore, the cost and weight of the apparatus can be decreased.

According to another aspect of the present invention, holding means for holding display means and image sensing means at a predetermined distance is arranged. The holding means forms a mounting unit for mounting an object on the display surface of the display means. With this arrangement, the mounting unit can be arranged between the image sensing means and the display means so that the display means can be applied as illumination means, and the mounted object can be photographed by the image sensing means. Since an object can be mounted on the display means and photographed by the image sensing means while using the display means as illumination means, a photographing operation can be satisfactorily performed without using any special illumination device.

According to another aspect of the present invention, correction means for correcting the luminance distribution of an object image incident on the image sensing means is provided. With this arrangement, the central portion of an image photographed in negative-positive reversal can be prevented from becoming dark because of a decrease in peripheral light amount of a photographing lens. The luminance distribution correction means enables a satisfactory photographing operation while preventing the central portion of an image photographed in negative-positive reversal.

According to still another aspect of the present invention, image data having luminance distribution characteristics for correcting a decrease in peripheral light amount caused by a photographing lens optical system is stored in a memory. The data is read out in use of display means as illumination means, and displayed on the display means, thereby correcting the luminance distribution. Since image data for correction is stored in the memory, the luminance distribution can be easily corrected.

With the correction means, when the display means is to be used as an illumination source for illuminating an object, illumination light having a luminance distribution for correcting the peripheral light amount of the photographing lens of photographing means can be obtained from the display means. Even when the peripheral light amount of the photographing lens decreases, the photographed image obtains an almost uniform light amount because correction can be performed on the illumination light emission side. Therefore, no expensive photographing lens whose peripheral light amount is improved need be used. In addition, a limitation on design is reduced, so that the product cost can be reduced.

According to another aspect of the present invention, correction means causes the display device of display means to emit light at a uniform luminance level. This light is photographed by image sensing means, and correction is performed on the basis of the photographing result such that an image output from the image sensing means is at a uniform level.

According to this arrangement, there is provided a method of correcting a luminance distribution. First, a display surface is caused to uniformly emit light to check a decrease in peripheral light amount of the photographing lens at that time. Subsequently, to correct the decrease in peripheral light amount of the lens, the luminance is corrected such that the light amount of the display light increases outward, thereby eliminating the influence of a decrease in peripheral light amount of the photographing lens.

According to still another aspect of the present invention, the display means has color correction means for arbitrarily setting the color of light emission on the di splay device.

With this arrangement, color temperature conversion of a negative or positive film can be performed. The same effect as in a photographing operation using a color filter mounted on an object can be obtained, so that a work according to the taste of the user can be obtained.

According to still another aspect of the present invention, the color correction means has a function of executing illumination using the display means in accordance with a desired color development level on a photographed image to convert the color temperature of the photographed image.

With this arrangement, for example, when the color temperature of the photographed image is to be lowered, the intensity of the R signal of a display image used for illumination must be increased. With this processing, the color temperature of a photographed image can be arbitrarily converted.

According to another aspect of the present invention, when a color component in the object is to be removed from the photographed image, the color correct ion means performs illumination in a similar color by using the display means.

With this arrangement, for example, when a green line is to be erased from the photographed image of an object, a display color having green spectral characteristics is displayed on the display means, with which the object is illuminated. With this operation, a specific color on an object can be erased from a photographed image, thereby removing an arbitrary color component from the photographed image.

According to still another aspect of the present invention, the image sensing means and the display means are coupled with each other while the distance therebetween is adjustable. For example, when the image sensing means and the display means are integrated with each other through a parallel link mechanism, the interval, i.e., the distance between an object and the image sensing means and the relative position can be freely changed.

According to still another aspect of the present invention, there is also provided an image sensing apparatus comprising a first housing accommodating image sensing means having a photographing optical system and an image sensing element for converting an optical image formed by the photographing optical system into an electrical signal, and a second housing accommodating display means for displaying an image on the basis of a video output from the image sensing means, wherein the first and second housings are fixed to free to pivot about a rotating shaft. With this arrangement, the image sensing apparatus can be folded and made compact. When video information is to be reproduced in outdoors, the image sensing unit serves as a visor for preventing a sun beam from being directly incident on the display means, so that a satisfactory view of the display means can be obtained.

According to still another aspect of the present invention, the first housing can be folded to shield the display surface of the display means. With this arrangement, the display means can be protected by folding the image sensing unit.

According to still another aspect of the present invention, the image sensing means has holding means for holding or positioning a sheet-like object such as a film in front of the photographing optical system. With this arrangement, a sheet-like object such as a film can be easily photographed.

According to still another aspect of the present invention, the second housing has mounting means for detachably mounting an almost flat card-like recording unit for recording a video signal obtained by the image sensing means and an almost flat card-like power supply unit for supplying power to the entire apparatus. The recording unit and the power supply unit are mounted such that the respective flat surfaces are stacked almost parallel to the display surface of the display means in the vertical direction. With this arrangement, the apparatus, and particularly the second housing can be made compact.

According to still another aspect of the present invention, the image sensing apparatus has angle holding means capable of holding the display surface at an arbitrary angle with respect to the horizontal plane. With this arrangement, the angle of the display means with respect to the user can be adjusted when the apparatus is placed on a table.

According to still another aspect of the present invention, the photographing optical system of the image sensing means is constituted by a zoom optical system capable of changing the photographing magnification and has a holding unit for holding or positioning a sheet-like object such as a film in front of the zoom optical system, and a detection unit for detecting that the sheet-like object is held or positioned by the holding unit. When the detection unit detects that the sheet-like object is held or positioned, the photographing optical system is set at a predetermined zoom magnification. With this arrangement, a sheet-like object such as a film can be further easily clearly photographed.

According to still another aspect of the present invention, the image sensing means has a pivotal incident light reflection means, a first photographing window for photographing a sheet-like object, and a second photographing window for photographing another object on the opposite side. With this arrangement, both the object in front of the image sensing unit and the object behind the image sensing unit can be photographed.

According to still another aspect of the present invention, the ON/OFF state of the power supply is controlled on the basis of an angle formed between the first housing and the second housing. For example, when the image sensing unit (first housing) is folded on the display unit (second housing) side, the power supply is automatically turned off. With this arrangement, the power supply can be prevented from being kept in an unused state.

According to still another aspect of the present invention, the apparatus can be held such that a surface of the housing accommodating the display means capable of displaying at least video information, which is on an opposite side of a surface where the display means is present, is in contact with a hand of the user holding the housing. With this arrangement, the apparatus can be easily held without being firmly gripped.

According to still another aspect of the present invention, operation switches are arranged to be operable with a finger of a hand holding the housing accommodating the display means. The operation switches include a release button for designating the start of recording video or speech information by the image sensing means or the start of reproduction of video information by the display means. Therefore, the release button is arranged to be operable with a finger of the left or right hand of the user who is holding the housing accommodating the display means, so that the release button can be easily operated.

According to still another aspect of the present invention, the housing accommodating the display means has a surface inclined with respect to the display surface, and the operation switches are arranged on this inclined surface.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 19 is a view showing the luminance intensity distribution of a display screen, which shows another example of a luminance correction means;

DETAILED DESCRIPTION OF THE PREFERRED EMBODIMENTS

Preferred embodiments of the present invention will now be described in detail in accordance with the accompanying drawings.

(First Embodiment)

The first embodiment will be described below with reference to FIGS. 1 to 7.

Figure 1:
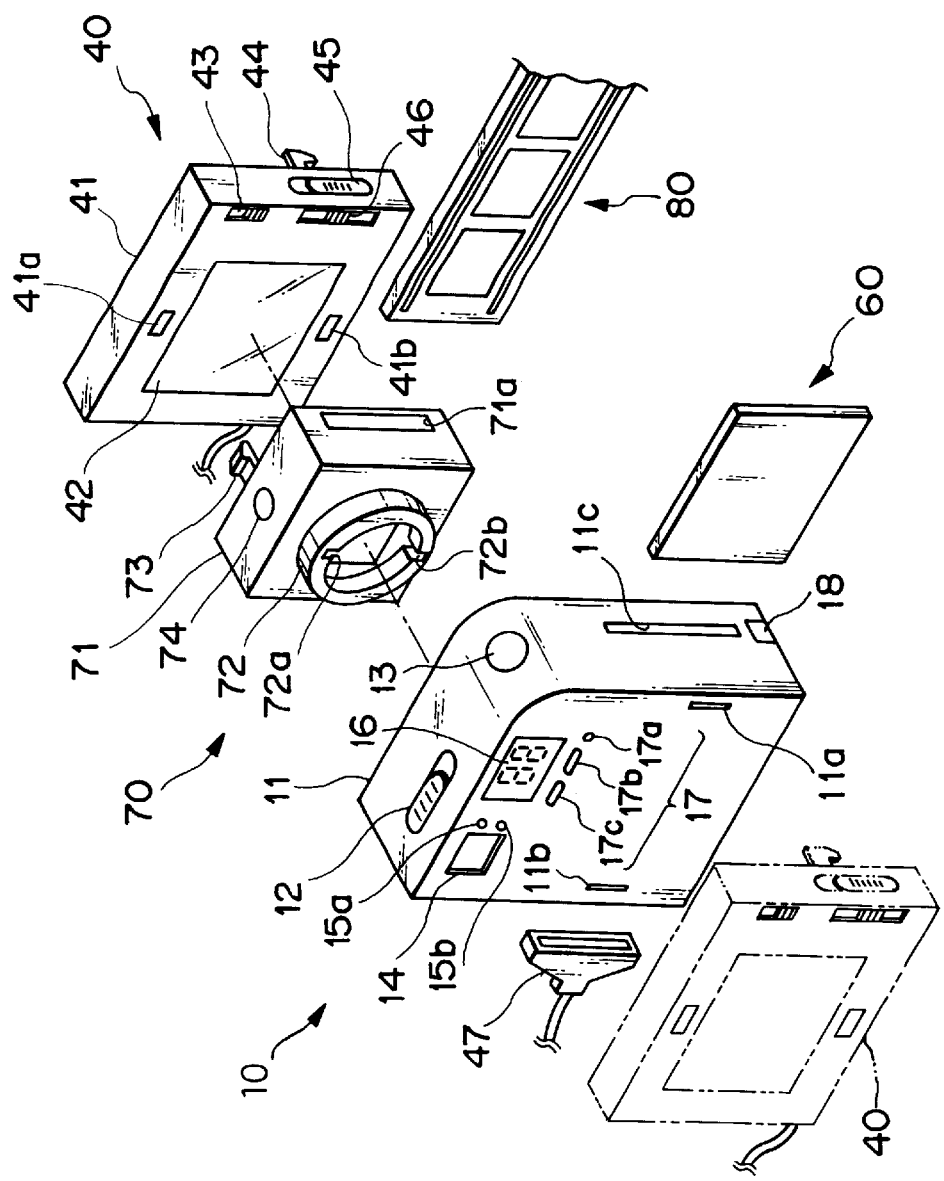
FIG. 1 is a perspective view schematically showing the overall arrangement of an image sensing/display apparatus according to the first embodiment.

FIG. 1 is a perspective view schematically showing the overall arrangement of an image sensing/display apparatus according to an embodiment of the present invention. Reference numeral 10 denotes an image sensing device. A cover 11 has hole portions 11a and 11b for receiving lock grips 44 of a display device 40 (to be described later) and an insertion slot 11c for receiving a recording medium 60. Reference numeral 12 denotes a power switch; and 13, a release button. The release button 13 is constituted as a two-stroke switch. When a first switch (SW1) is turned on at the first stroke position, a prephotographing operation such as photometry and distance measurement is executed. When a second switch (SW2) is turned on at the second stroke position, a photographing operation is executed.

Reference numeral 14 denotes a finder. Light-emitting diodes (LED) 15a and 15b for displaying completion of charging of an electronic flash or various warnings are arranged adjacent to the finder 14. With this arrangement, the user can confirm the ON state of the LED 15a or 15b while he/she is viewing or not viewing an object through the finder 14. An LCD (display unit) 16 displays the number of frames, the remaining amount of a battery, or a photographing mode. Operation buttons 17 comprising switches 17a to 17c are used to select a photographing mode or an image to be reproduced or erased. An eject button 18 is used to eject the recording medium.

The display device 40 is detachable from the image sensing device 10. When the display device 40 is to be used as an image display device, it can be mounted on the rear surface of the image sensing device 10, as indicated by a chain double-dashed line in FIG. 1. When a negative or positive film is to be photographed, the display device 40 is fixed in front of the photographing lens through a film fixing unit 70 (to be described later) and used as an illumination device. The image sensing device 10 and the display device 40 are connected to each other through an interface (I/F) connector (to be described later) so that supply of power or transfer of a video signal is performed.

In the display device 40, a cover 41 has hole portions 41a and 41b for receiving lock grips 73 of the film fixing unit 70 (to be described later). Reference numeral 42 denotes a display panel consisting of a 3- to 4-inch LCD display device; and 43, a power switch 43 of the display device 40. The pair of lock grips 44 (one of them is not shown) are used to attach the display device 40 to the image sensing device 10. The lock grips 44 are inserted to the corresponding hole portions 11a and 11b of the image sensing device 10, thereby fixing the display device 40 and the image sensing device 10 at a position where the cover 11 of the image sensing device 10 is almost in tight contact with the cover 41 of the display device 40. A release lever 45 is used to release the display device 40 from the image sensing device 10 in a manner interlocked with the lock grips 44. An adjustment knob 46 (backlight adjustment unit) is used to change the brightness of the display panel 42.

The recording medium 60 consisting of a solid-state memory or a hard disk is interchangeable. The recording medium 60 is inserted to the insertion slot 11c of the image sensing device 10, as shown in FIG. 1.

The film fixing unit 70 connects the image sensing device 10 to the display device 40. The film fixing unit 70 has a guide unit for a film holder 80 (to be described later) so that a film is positioned with respect to the image sensing device 10 and the display device 40. In the film fixing unit 70, a cover 71 has a hole portion 71a for receiving the film holder 80. The film holder 80 can pass through the film fixing unit 70 through the hole portion 71a and a hole portion formed on the opposite side. Reference numeral 72 denotes a clamping ring. When the clamping ring 72 is pivoted, the film fixing unit 70 can be fixed/released to/from a filter screw (not shown) of the image sensing device 10. The clamping ring 72 also has groove portions 72a and 72b for regulating the position in the direction of rotation.

The pair of lock grips 73 (one of them is not shown) are used to attach the film fixing unit 70 to the image sensing device 10. The lock grips 73 are inserted to the corresponding hole portions 41a and 41b of the display device 40, thereby fixing the display device 40 and the film fixing unit 70 at a position where the cover 41 of the display device 40 is almost in tight contact with the cover 71 of the film fixing unit 70. A release button 74 is used to release the film fixing unit 70 from the display device body in a manner interlocked with the lock grips 73.

As for the film holder 80, all sizes corresponding to various films are available. With this film holder 80, a film is positioned in a plane perpendicular to the optical axis of the photographing lens, and also positioned at a predetermined distance from the photographing lens along the direction of the optical axis.

Figure 2:
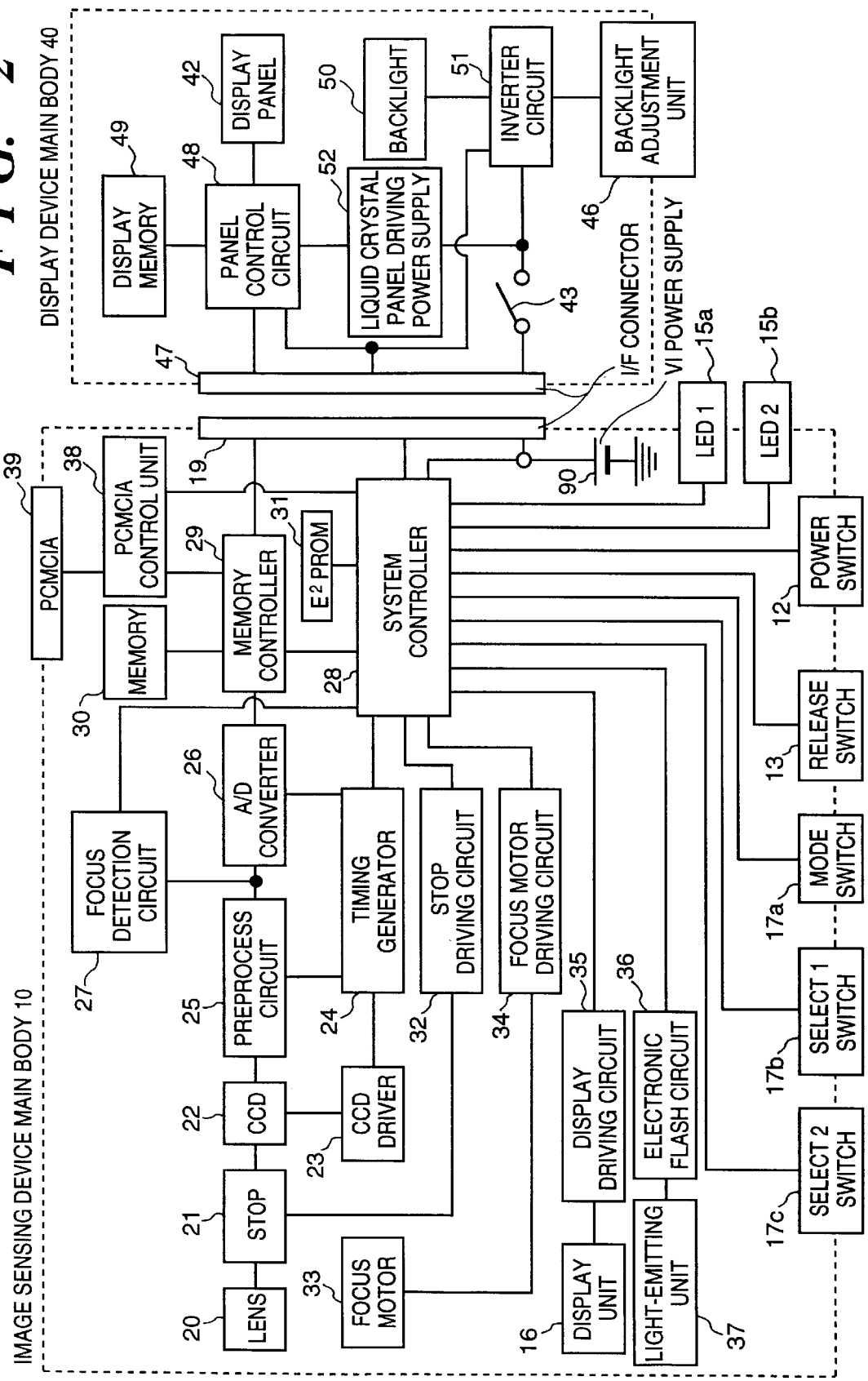
FIG. 2 is a block diagram showing the overall arrangement of the image sensing/display apparatus of the present invention.

FIG. 2 is a block diagram showing the overall arrangement of a system according to the present invention.

Referring to FIG. 2, the release button 13 is constituted as a two-stroke switch, as described above. A system controller 28 detects the ON state of the first switch SW1 at the first stroke position, thereby starting the prephotographing operation such as a focusing operation and exposure condition detection. The system controller 28 detects the ON state of the second switch SW2 at the second stroke position, thereby executing the photographing operation. The LEDs 15a and 15b are connected to the system controller 28 to display completion of charging of the electronic flash, completion of the focusing operation, a low luminance warning, and the like. The mode switch 17a in the operation buttons 17 switches the operation mode of the camera between recording, reproduction, erase, and film photographing modes. The select switches 17b and 17c select a recorded image to be reproduced or erased and switch a negative/positive mode in the film photographing operation. The mode switch 17a and the select switches 17b and 17c are connected to the system controller 28.

An I/F connector 19 on the image sensing device 10 side is connected to an I/F connector 47 on the display device 40 side. Reference numeral 20 denotes a lens; 21, a stop for adjusting an incident light amount; 22, an image sensor such as a CCD; 23, a driver (CCD driver) for driving the image sensor 22; and 24, a timing generator. The image sensor 22 is driven through the CCD driver 23 in accordance with a timing generated by the timing generator 24.

Reference numeral 25 denotes a preprocess circuit for performing predetermined signal processing of an image sensing signal output from the image sensor 22; 26, an analog/digital converter (A/D converter); and 27, a focus detection circuit for extracting a focus evaluation signal such as a high-frequency component, which changes in accordance with the in-focus state of the image sensing signal output from the preprocess circuit 25, to detect an in-focus state.

The system controller 28 controls the entire camera system. A memory controller 29 performs read/write access to a memory 30, or a refresh operation of the memory 30. A photographed video signal is converted into a digital signal by the A/D converter 26 and stored in the storage circuit of the memory 30 through the memory controller 29. An output from the focus detection circuit 27 is input to the system controller 28 so that the driving direction, the velocity, the moving amount of the focus lens according to the focus state are calculated.

An EEPROM 31 is connected to the system controller 28 and holds necessary data. Reference numeral 32 denotes a stop driving circuit for driving the stop 21 on the basis of an instruction from the system controller 28; 33, a focus motor; and 34, a focus motor driving circuit for driving the focus motor 33 on the basis of an instruction from the system controller 28. The reference numeral 35 denotes a display unit driving circuit through which the display unit 16 is controlled by the system controller 28 and displays the number of frames, the remaining amount of a battery, or a photographing mode. An electronic flash circuit 36 charges a capacitor and generates a trigger signal on the basis of an instruction from the system controller 28, thereby causing a light-emitting unit 37 to emit light.

A PCMCIA control unit 38 performs data input/output processing in accordance with a PCMCIA format used for an IC memory card or the like. A PCMCIA connector 39 is constituted to input/output video data or program data to/from a recording medium such as a memory card connected to the PCMCIA connector 39 through the PCMCIA control unit 38. Note that PCMCIA is an abbreviation of "Personal Computer Memory Card International Association".

In FIG. 2, a power supply 90 is a battery or a DC power supply and supplies power to the display device 40 through the I/F connectors 19 and 47.

The system configuration of the display device 40 will be described below.

The I/F connector 47 is connected to the I/F connector 19, as described above. A panel control circuit 48 drives the display panel 42 consisting of an LCD or the like on the basis of a video signal sent from the image sensing device 10. A display memory 49 displays, in accordance with an instruction from the system controller 28, the contents of the instruction on the display panel 42 through the panel control circuit 48. Reference numeral 50 denotes a backlight using a cold cathode-ray tube or the like; and 51, an inverter circuit for the backlight 50. When the adjustment knob 46 serving as a backlight adjustment unit is operated, the brightness of the backlight 50 can be adjusted. Upon turning on the power switch 43, power is supplied from the image sensing device 10 through the I/F connectors 19 and 47. Reference numeral 52 denotes a liquid crystal panel driving power supply.

The image sensing/display apparatus according to this embodiment has the above arrangement, and the function thereof will be described below. A film photographing operation (film photographing mode) as a characteristic feature of this apparatus will be described. A detailed description of a normal photographing/erase operation and a reproducing operation on the display panel will be omitted.

Figure 7:
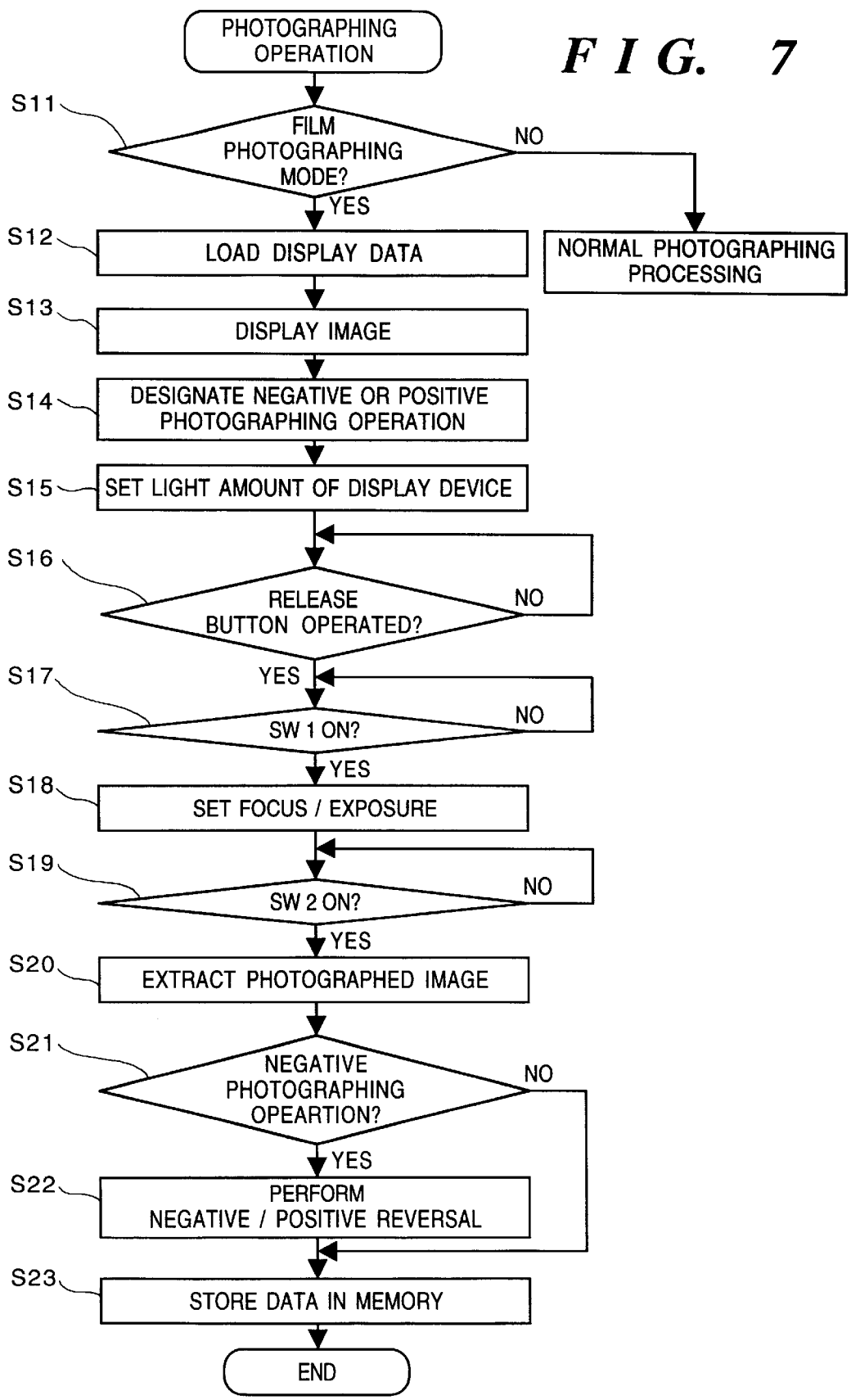
FIG. 7 is a flow chart for explaining the photographing procedures according to the first embodiment.

The film photographing mode is executed when the image sensing device 10 and the display device 40 are fixed while sandwiching the film fixing unit therebetween. A film as an object is set in the film holder 80, and the film holder 80 is mounted on the film fixing unit 70, thereby performing the film photographing operation. FIG. 7 is a flow chart for explaining the photographing procedures at this time.

Figure 5:
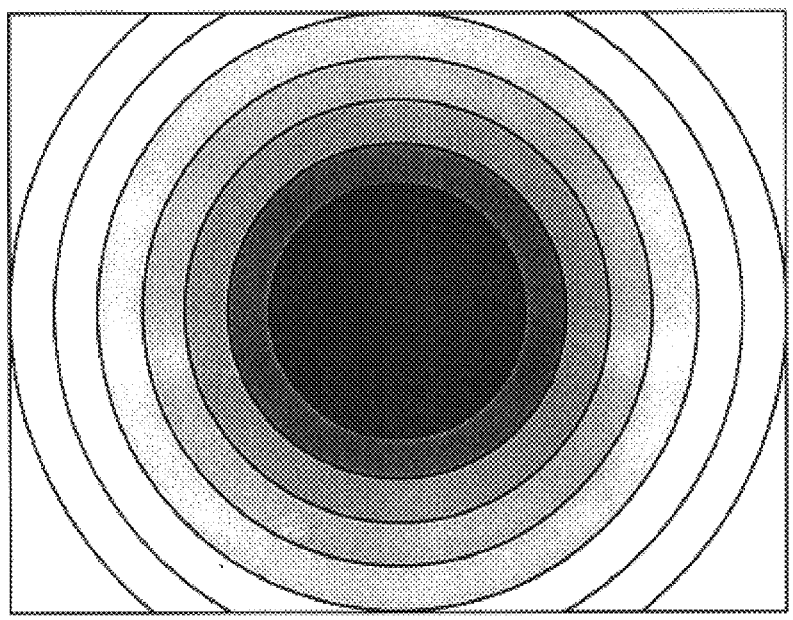
FIG. 5 is a view showing an image pattern for light amount correction.

Referring to FIG. 2, when the mode switch 17a is operated to select the film photographing mode, image data with a pattern shown in FIG. 5 is read out from the display memory 49 by the system controller 28. The panel control circuit 48 displays this image data on the display panel 42. Note that this image pattern may be stored in the EEPROM 31 on the image sensing device 10 side (steps S11 to S13 in FIG. 7).

Figure 3:
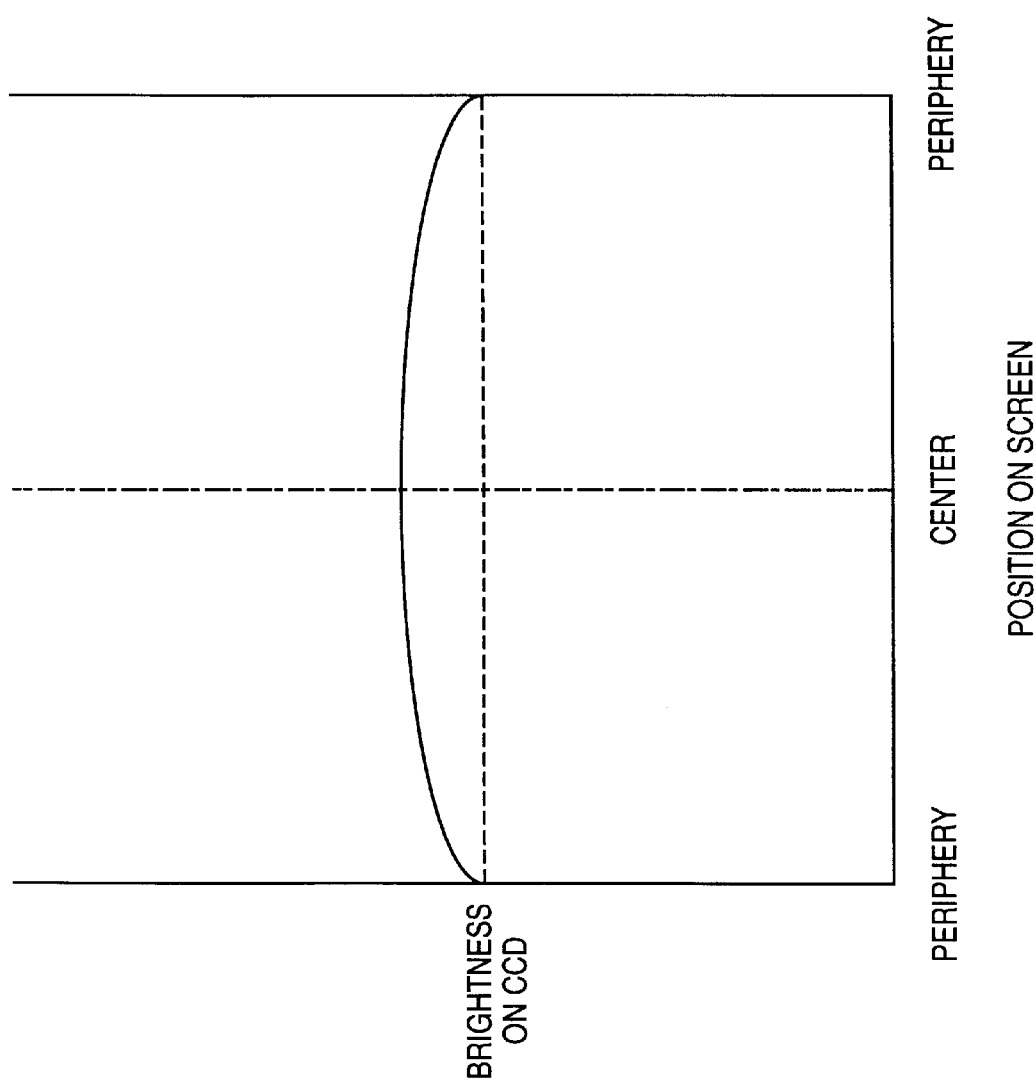
FIG. 3 is a graph showing the luminance distribution before and after light amount correction on an image sensing surface.
Figure 6:
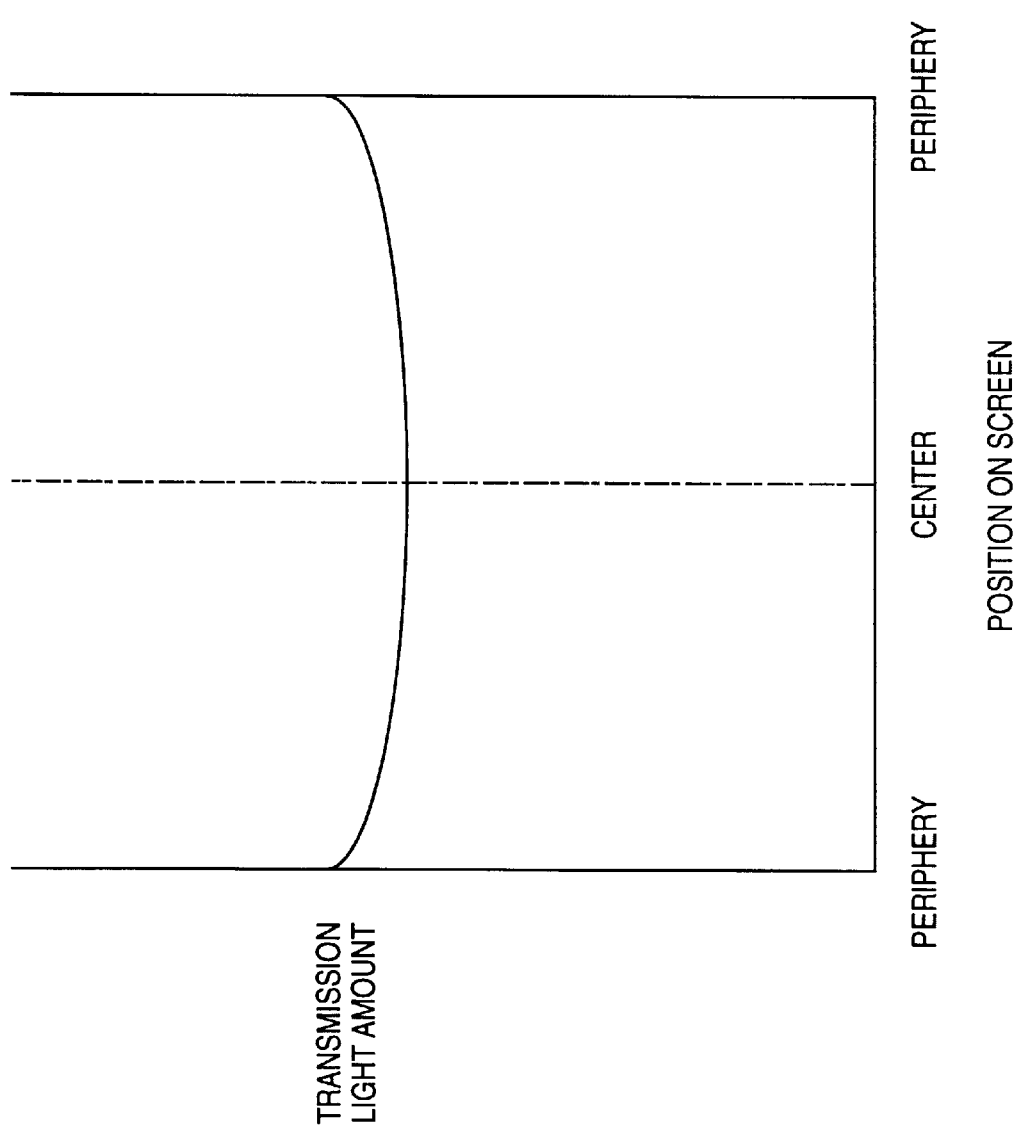
FIG. 6 is a graph showing the luminance distribution after transmission through a display panel, which is observed when the image pattern for light amount correction is used.

The image pattern shown in FIG. 5 serves as a luminance distribution correction means for correcting a decrease in peripheral light amount caused by the photographing lens 20 to obtain a uniform luminance distribution. More specifically, according to this image pattern, when light in an almost uniform amount from the backlight 50 is transmitted through the display panel 42, the light amount distribution is corrected such that the transmission light amount at the central portion decreases as compared to that at the peripheral portion. FIG. 6 is a graph showing the luminance distribution after light is transmitted through the display panel 42. As shown in FIG. 6, in the backlight transmitted through the display panel 42, the luminance at the central portion is suppressed as compared to that at the peripheral portion. Therefore, as for the light amount of the backlight transmitted through the photographing lens 20 and reaching the image sensing surface of the image sensor 22, the decrease in peripheral light amount of the photographing lens 20 is corrected by the image pattern, and a uniform luminance distribution as indicated by a dotted line in FIG. 3 is obtained. When negative/positive inversion of this pattern is performed, a uniform luminance distribution is similarly obtained, as indicated by a dotted line in FIG. 4.

In the film photographing mode, an input from the adjustment knob 46 is ignored by the system controller 28, and a predetermined light amount is set. This predetermined light amount may be changed between a negative photographing mode and a positive photographing mode. When the mode switch 17a is operated to select the film photographing mode, a negative or positive image is displayed on the display unit 16. By operating the select switches 17b and 17c, the negative photographing mode or the positive photographing mode is selected (steps S14 and S15).

The photographing operation is started by turning on the release button 3. The system controller 28 detects the ON state of the switch SW1, thereby starting the prephotographing operation such as the focusing operation and exposure condition detection (steps S16 to S18). In the photographing mode, the film position is fixed by the film holder 80. Therefore, the focusing operation may be inhibited by the system controller 28 to stop the photographing lens 20 at a predetermined position. Subsequently, the ON state of the switch SW2 is detected, and the photographing operation is executed (steps S19 and S20). Processes until a video signal obtained by the CCD 22 is input to the memory controller 29 in the negative or positive photographing mode are the same as those in a general photographing operation.

When the negative photographing mode is selected, the video signal input to the memory controller 29 is subjected to negative/positive reversal in accordance with an instruction from the system controller 28 and stored in the memory 30. The video signal is sent to the PCMCIA connector 39 through the PCMCIA control unit 38 and recorded on the recording medium 60. Similarly, when the positive photographing mode is selected, the same processing as in the negative photographing mode is performed except that the negative/positive inversion is not performed (steps S20 to S23).

Note that, in the film photographing mode, electronic flash emission is inhibited in accordance with an instruction from the system controller 28.

As described above, according to the first embodiment, the display device 40 and the image sensing device 10 are fixed at a predetermined distance while sandwiching the film fixing unit 70 therebetween. For this reason, the mounting unit for mounting an object can be arranged between the image sensing device 10 and the display device 40. The display device 40 can be used as an illumination means to photograph the mounted object by the image sensing device 10. Therefore, a satisfactory photographing operation can be performed without requiring any special illumination device.

In addition, according to the first embodiment, the luminance distribution of illumination light incident on the CCD in the film photographing mode is corrected, thereby preventing the central portion of a photographed image from becoming dark in negative/positive inversion. Therefore, a satisfactory photographing operation can be performed while preventing the central portion of a photographed image from becoming dark in negative/positive inversion.

Furthermore, according to the first embodiment, image data having luminance distribution characteristics for correcting a decrease in peripheral light amount caused by the photographing lens optical system is stored in the memory. When the display device 40 is to be used as an illumination means, this image data is displayed to correct the luminance distribution. Therefore, luminance distribution correction can be easily realized at a low cost.

(Second Embodiment)

Figure 8:
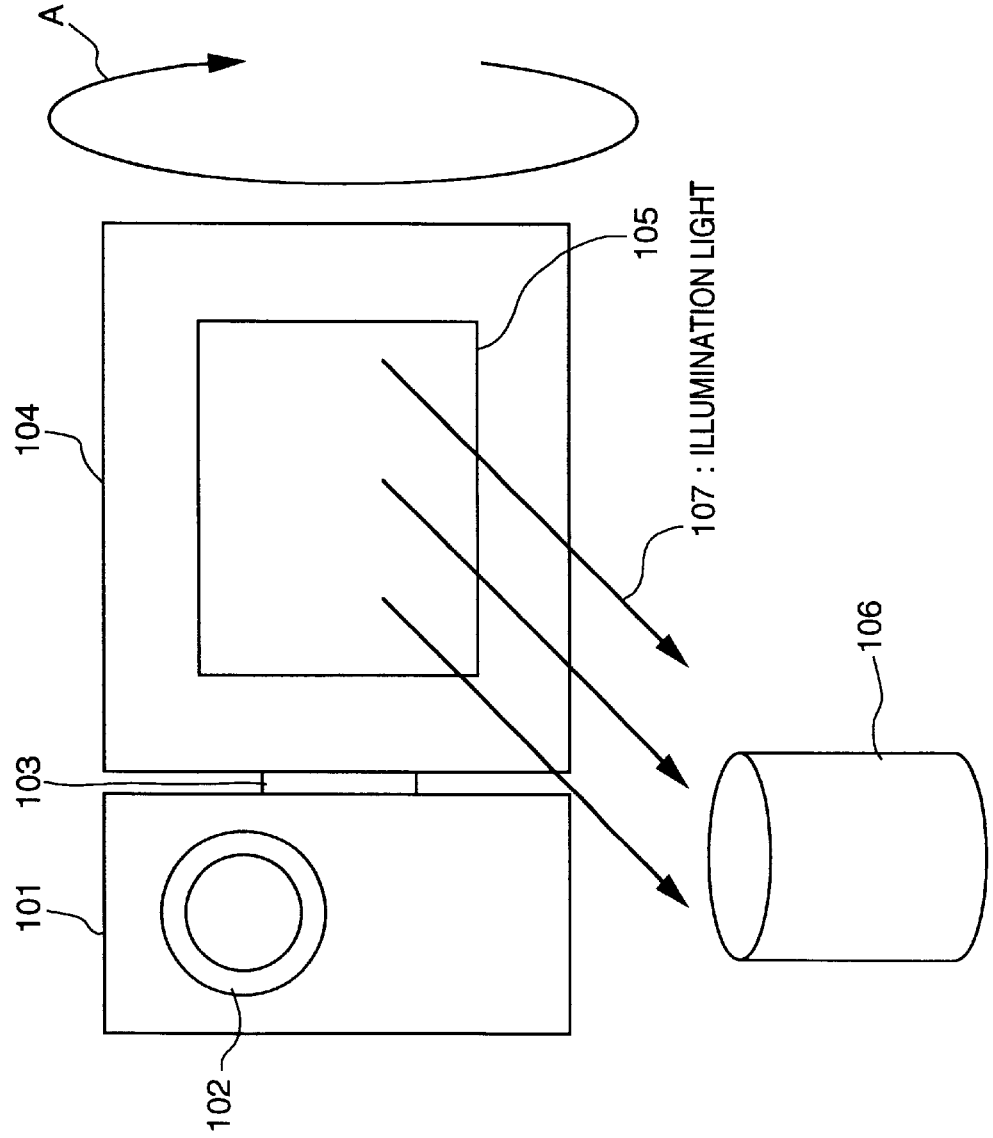
FIG. 8 is a front view schematically showing the arrangement of an image sensing apparatus according to the second embodiment of the present invention.

FIG. 8 is a front view schematically showing the arrangement of an image sensing apparatus according to the second embodiment.

An image sensing unit 101 has a photographing lens 102 for photographing an object and additionally incorporates an image sensing element (not shown) such as a CCD at the focal position of the photographing lens 102. A display unit 104 is mounted on the image sensing unit 101 through a coupling member 103. The display unit 104 has a liquid crystal display device 105 (e.g., a liquid crystal display device with a backlight using a cold cathode-ray tube) and can be rotated through 360° (indicated by an arrow A) about the coupling member 103 in the vertical direction. In a normal photographing operation, the liquid crystal display device 105 is used as a view finder on the rear surface in FIG. 8.

With the arrangement in FIG. 8, when an object 106 is to be photographed by the image sensing unit 101, the illuminance at the object 106 may become insufficient depending on situations. In such a case, the object 106 is conventionally illuminated with an illumination means such as a lamp. In the second embodiment, however, instead of using an additional illumination means, the liquid crystal display device 105 is used as an illumination means in the photographing operation. More specifically, if the illuminance at the object 106 is insufficient, the display unit 104 is rotated to set the liquid crystal display device 105 facing the object 106 side. When the display color of the liquid crystal display device 105 is changed to monochromatic light with a high luminance, which does not color the object 106, e.g., entirely white, the liquid crystal display device 105 can be used as an illumination source.

As for luminance adjustment of the liquid crystal display device 105, the maximum luminance can be obtained when an entirely white screen is set. However, when a gray or black-and-white stripe screen display is set, the luminance can be changed. In addition, when the display color of the liquid crystal display device 105 is selected, the atmosphere of the object 106 can be changed. Furthermore, when flickering occurs on the liquid crystal display device 105, the photographing operation is preferably performed in synchronism with the light emission timing of the liquid crystal display device 105. Note that, when a view finder with the similar arrangement as that of a twin-lens reflex camera is arranged, the photographing state can be confirmed even when the liquid crystal display device 105 is used as an illumination means.

As described above, when the liquid crystal display device 105 of the display unit 104 is used to illuminate the object 106, the object 106 can be illuminated without using any additional illumination means.

(Third Embodiment)

Figure 9:
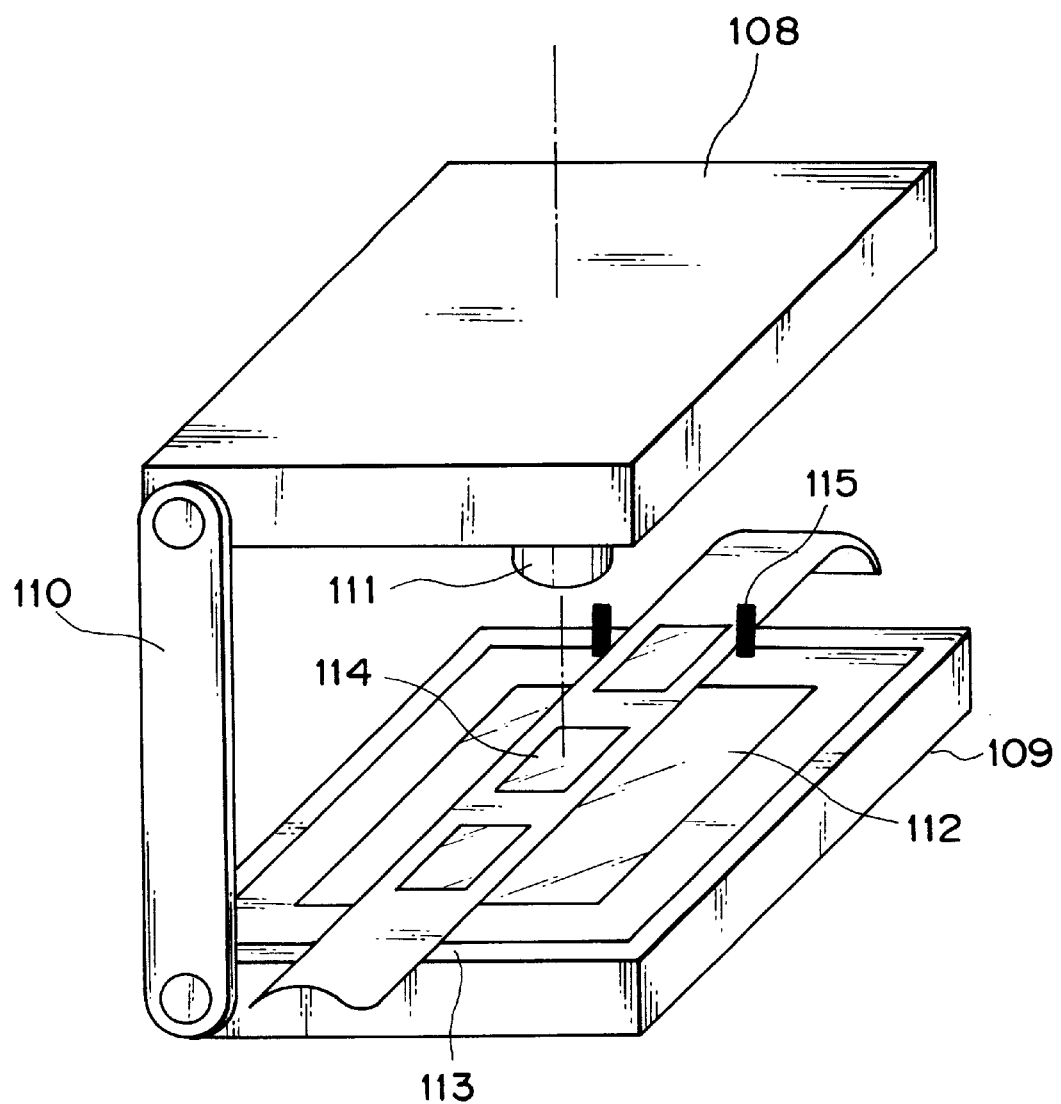
FIG. 9 is a perspective view showing an image sensing apparatus according to the third embodiment of the present invention.

FIG. 9 is a perspective view showing an image sensing apparatus according to the third embodiment.

The image sensing apparatus shown in FIG. 9 is mainly constituted by an image sensing unit 108, a display unit 109, and a parallel link mechanism 110. The image sensing unit 108 has an external photographing lens 111 and incorporates an image sensing element (not shown) such as a CCD. The display unit 109 has a flat panel shape, and the display surface of a liquid crystal display device 112 with a backlight is exposed to one side of the display unit 109. The surface of the liquid crystal display device 112 and the surface of the display unit 109 are set at the same level, and this surface serves as an object mounting unit 113 on which an object 114 such as a negative or positive film is mounted. To guide the object 114 to the optimum position, a pin-like guide 115 stands on the object mounting unit 113.

Figure 10:
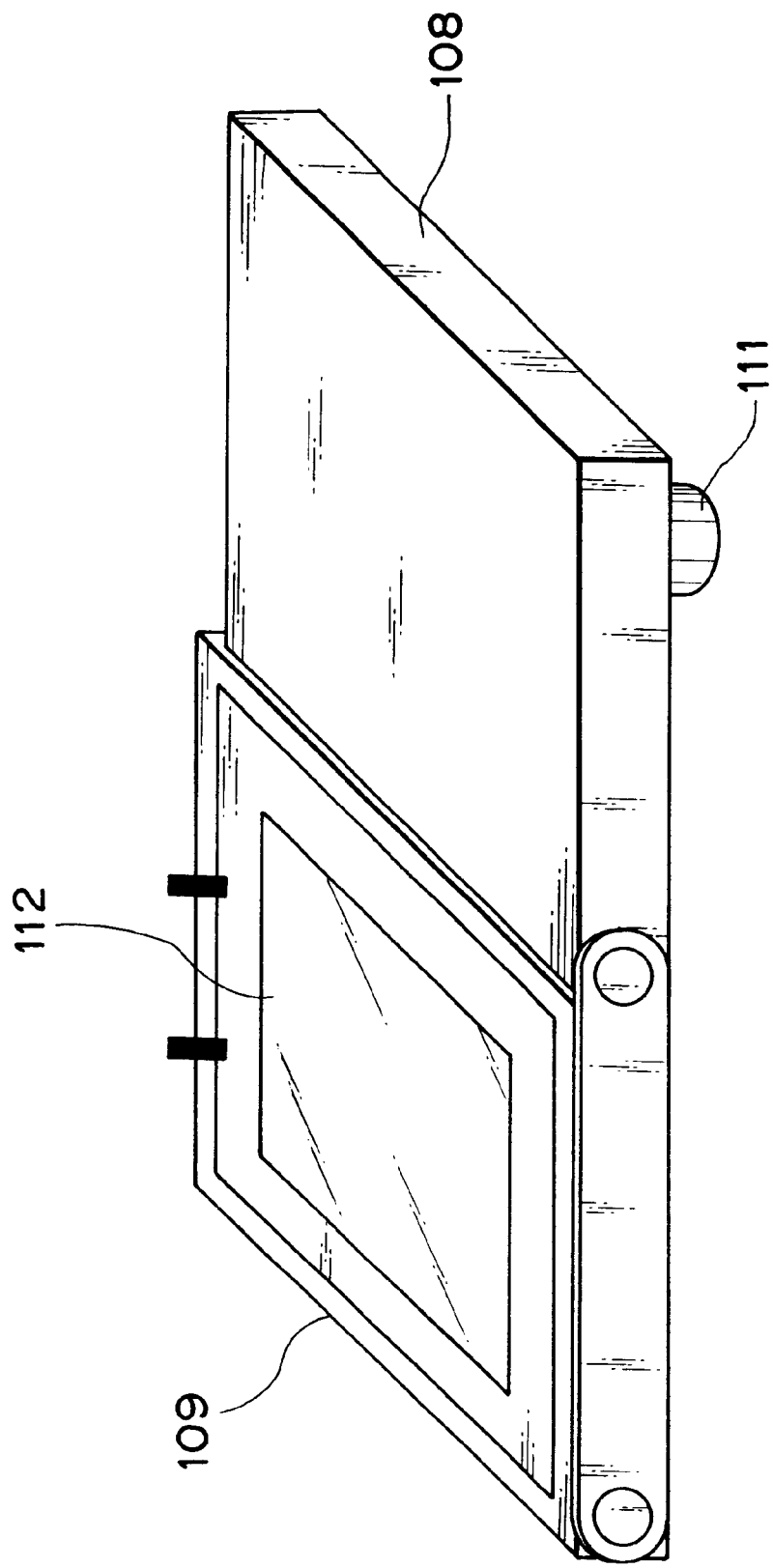
FIG. 10 is a perspective view showing a state wherein a display device is used as a view finder in the image sensing apparatus shown in FIG. 9.

Since the image sensing unit 108 and the display unit 109 are coupled to each other through the parallel link mechanism 110, the posture of the image sensing unit 108 and the display unit 109 can be changed, as shown in FIGS. 9 and 10. In addition, with the posture shown in FIG. 9, the distance between the image sensing unit 108 and the display unit 109 can be changed. In a film photographing mode, when the object 114 mounted on the object mounting unit 113 is to be photographed, the image sensing unit 108 and the display unit 109 are positioned such that the photographing frame of the object 114 coincides with the optical axis of the photographing lens 111 (FIG. 9). In a normal photographing operation, a state as shown in FIG. 10 is set so that the display unit 109 is used as a view finder.

Figure 4:
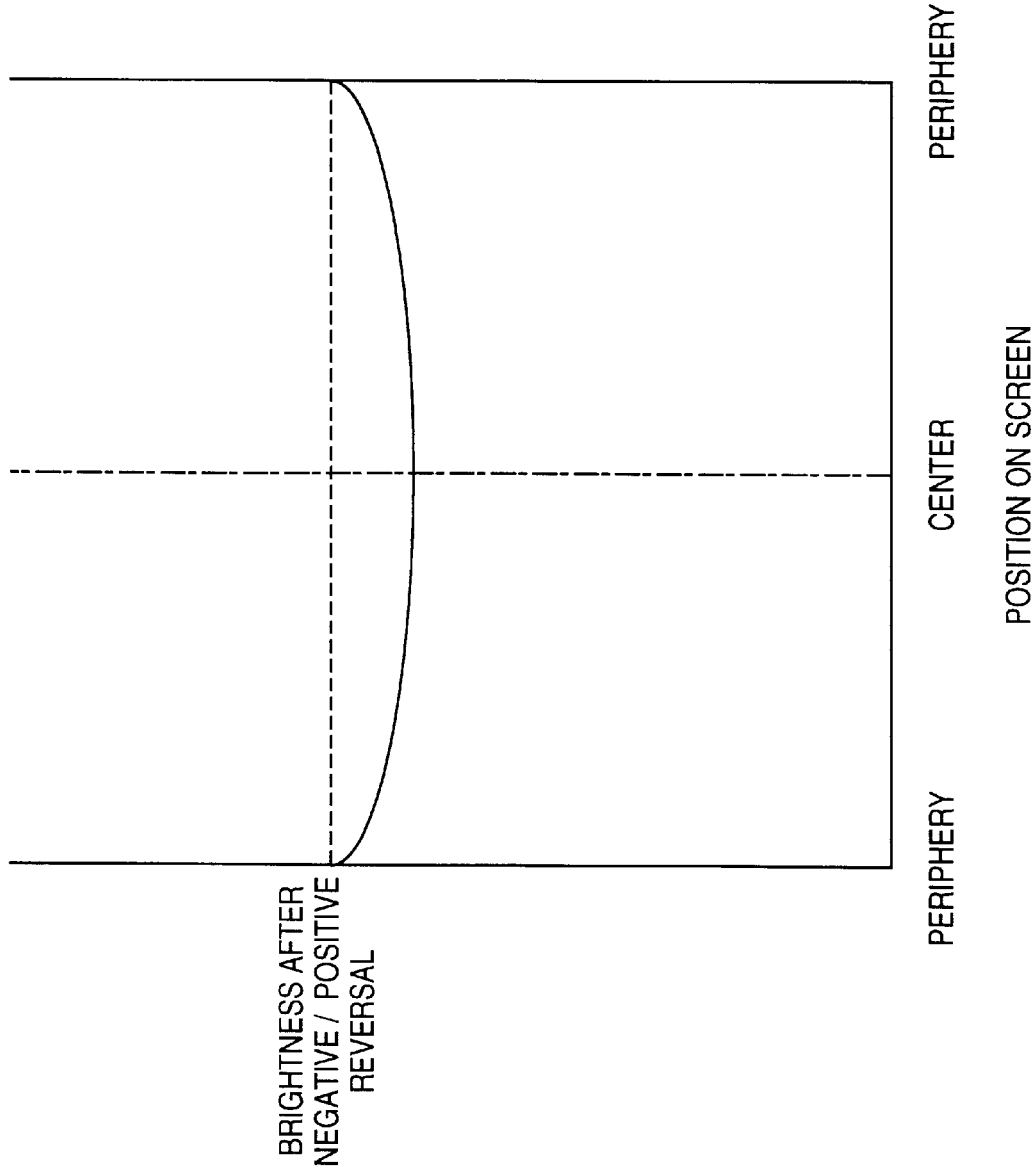
FIG. 4 is a graph showing the luminance distribution before and after light amount correction on the image sensing surface after negative/positive inversion.
Figure 11:
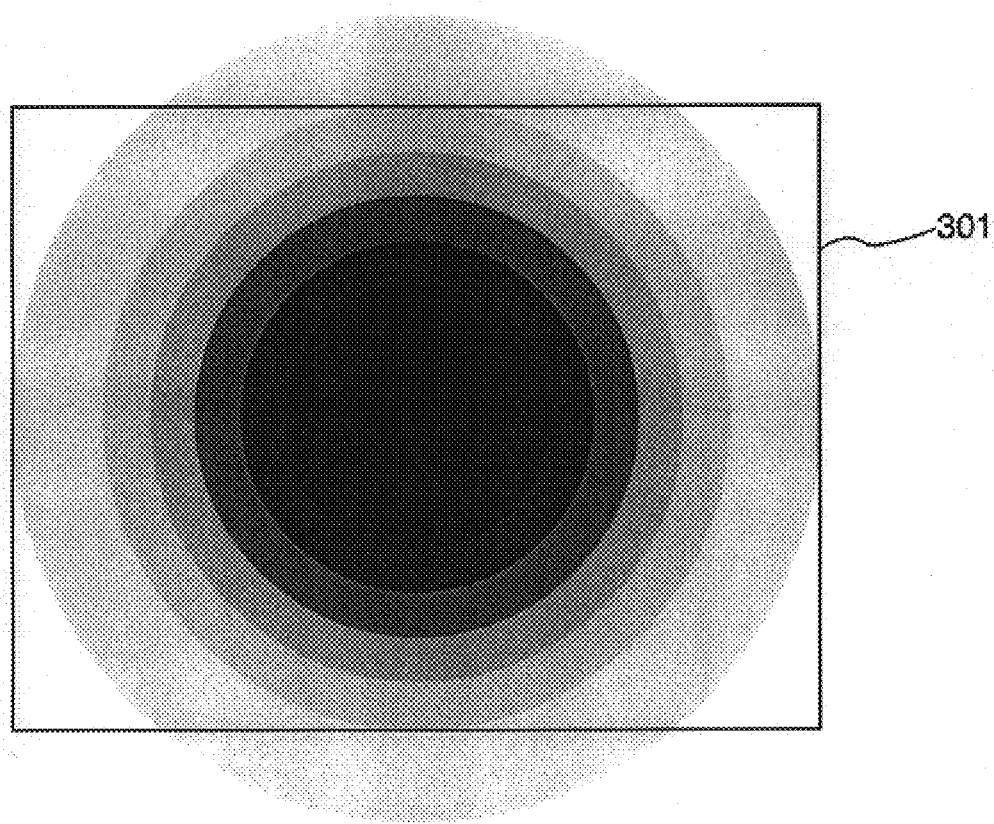
FIG. 11 is a view showing an intensity distribution for luminance correction in the embodiment shown in FIG. 9.

After positioning is performed in the state of FIG. 9, the image sensing unit 108 operates an auto-focusing mechanism to drive the photographing lens 111, thereby executing the focusing operation with respect to the object 114. Subsequently, luminance correction is performed by the display unit 109. Luminance correction is performed to correct a decrease in peripheral light amount of the photographing lens 111. As shown in FIG. 11, in luminance correction, an image is displayed on the liquid crystal display device 112 such that the light amount increases from the central portion in the radial direction, thereby correcting a luminance variation caused by the decrease in peripheral light amount of the photographing lens. This correction operation is the same as that described in the first embodiment (FIGS. 3, 4, and 6). A black frame shown in FIG. 11 represents a photographing field frame.

Image data for luminance correction is generated in accordance with following procedures.

The liquid crystal display device 112 is caused to uniformly emit light while the object 114 is not set on the object mounting unit 113. At this time, the photographing lens 111 opposes the liquid crystal display device 112 (FIG. 9) so that the image sensing unit 108 can sense the display image on the liquid crystal display device 112. Since the liquid crystal display device 112 uniformly emits light, information of the distribution of a decrease in peripheral light amount of the photographing lens 111 can be obtained by photographing the screen. On the basis of this information, data for correcting the light emission characteristics of the display unit 109 to unify the image obtained by the image sensing unit 108 itself can be obtained. This data is stored in a semiconductor memory such as a RAM. By reading out this data in an illumination operation, luminance correction can be performed.

In addition, when the color of the illumination light of the liquid crystal display device 112 is changed in accordance with the requirement of the user, color temperature conversion of a negative or positive film is enabled. For example, when the color temperature of an image to be photographed by the user is to be set relatively low, the user adjusts and increases the intensity of the red signal of the liquid crystal display device 112 on the basis of the green and blue signals, so that the color temperature of the entire image can be lowered. Alternatively, when the adjustment levels of color temperature conversion are set in advance, and the user selects one of the adjustment levels, color adjustment can be performed.

When luminance/color correction is completed, and the liquid crystal display device 112 is stabilized, the object 114 is photographed. Photographed image data is recorded in a memory in the image sensing unit 108 or a recording medium such as a magnetic disk. The recorded image data is output to the liquid crystal display device 112 by the operation of the user.

To uniform the display light of the liquid crystal display device 112, a diffusion plate can be arranged on the display unit 109 and the object mounting unit 113.

As described above, according to the third embodiment, a decrease in peripheral light amount of the photographing lens 111 is coped with a change in luminance distribution of the display image on the display unit 109. Therefore, the decrease in light amount of the photographing lens 111 is corrected so that a disadvantage such as a brightness variation between the peripheral portion and the central portion in the photographing operation of the object 114 is solved. In addition, since uniform irradiation light is photographed to obtain correction data, appropriate correction data can be obtained in units of photographing lenses, so that a limitation on design of the photographing lens 111 can be eliminated.

(Fourth Embodiment)

Figure 12:
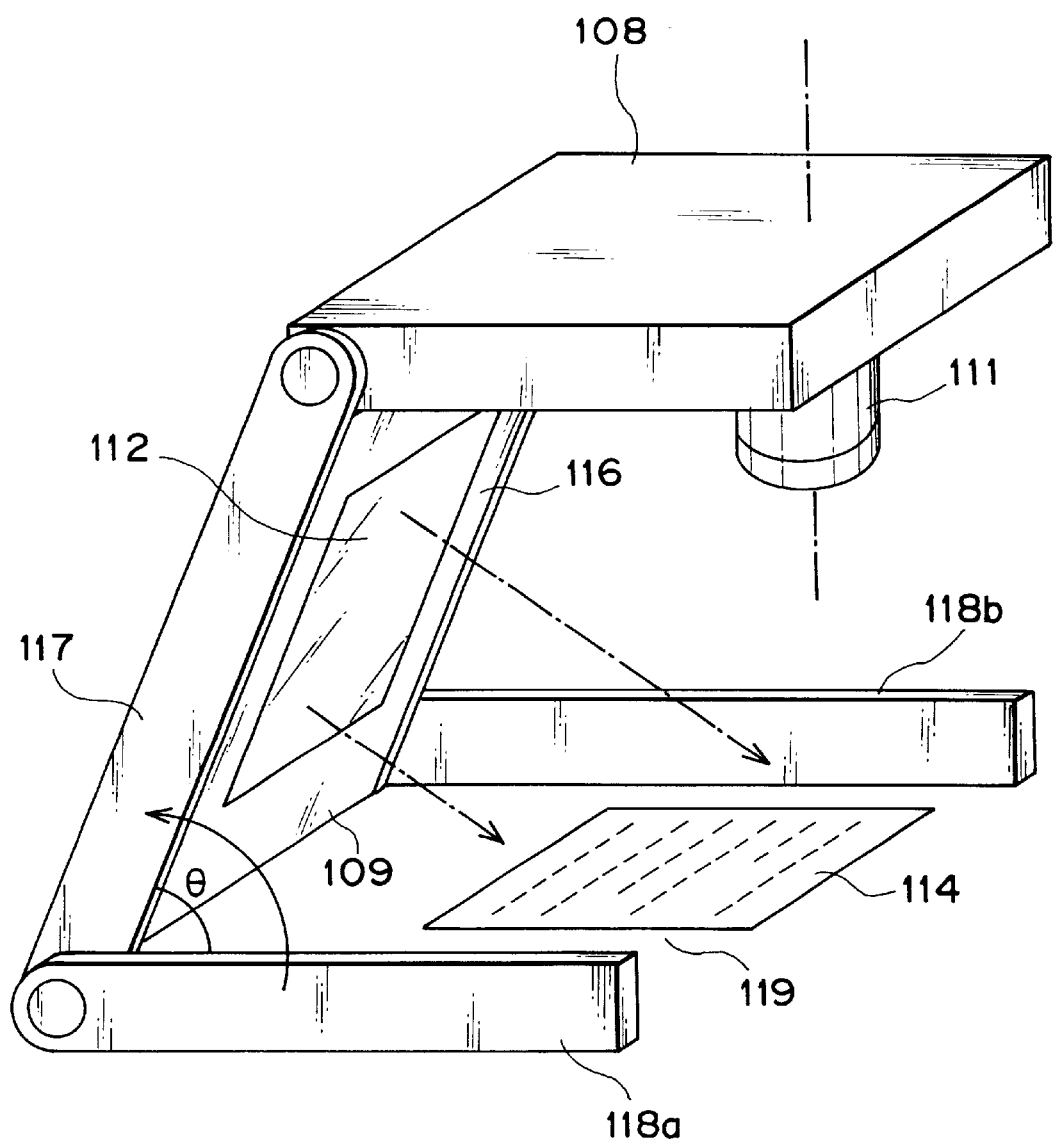
FIG. 12 is a perspective view showing an image sensing apparatus according to the fourth embodiment of the present invention.

FIG. 12 is a perspective view of an image sensing apparatus according to the fourth embodiment. The same reference numerals as in FIG. 9 denote the same parts in this embodiment, and a detailed description thereof will be omitted.

In the fourth embodiment, as shown in FIG. 12, both the sides of a display unit 116 on which a liquid crystal display device 112 is mounted are held by a holding portion 117. The end portion of an image sensing unit 108 is pivotally coupled to the upper end of the holding portion 117. Bar-like leg portions 118a and 118b are pivotally coupled to the lower end of the holding portion 117. No member attached to the apparatus is arranged between the leg portions 118a and 118b. When this apparatus is placed on a table or the like, the table is exposed between the leg portions 118a and 118b, and the exposed portion serves as an object mounting unit 119, so that an object 114 is mounted, as shown in FIG. 12. To illuminate the object 114, the display surface of the liquid crystal display device 112 of the display unit 116 is mounted facing the object 114.

In the fourth embodiment as well, a luminance correction unit and a color correction unit are arranged in the image sensing unit 108 or the display unit 116. Therefore, prior to the photographing operation of the object 114, the object mounting unit 119 is illuminated with the liquid crystal display device 112 whose entire screen emits light at a uniform luminance. At the same time, positioning is performed such that an appropriate positional relationship is established between the image sensing unit 108, the liquid crystal display device 112, and the object mounting unit 119. The object mounting unit 119 without the object 114 is focused, and only the object mounting unit 119 is photographed by a photographing lens 111. On the basis of the image information, the information of the distribution of a decrease in peripheral light amount is obtained. On the basis of this information, luminance correction is performed as described in the third embodiment so that the decrease in peripheral light amount of the photographing lens 111 is coped with a change in luminance distribution of the display image of the liquid crystal display device 112. As a result, the decrease in light amount of the photographing lens 111 is corrected. Therefore, even when the object 114 is photographed, a disadvantage such as the brightness variation between the peripheral portion and the central portion is eliminated.

A specific color component in an original can be removed using the above-described color correction means. Assume that a green line is drawn on an original with a text printed in black. To remove the green line from the original, the user can remove the green component on the original by selecting a "green removing mode". The principle will be described below in detail. Although only the "green removing mode" will be described below, a "red removing mode" and a "blue removing mode" are also available in addition to the "green removing mode".

Figure 13:
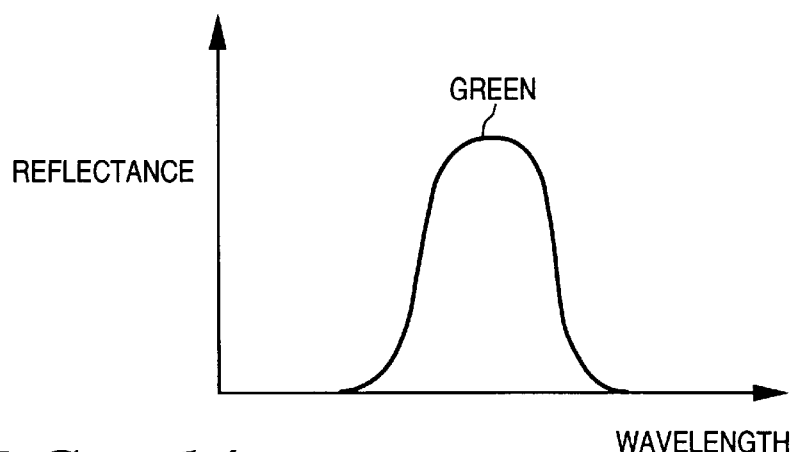
FIG. 13 is a graph showing the spectral reflectance of a green component.
Figure 14:
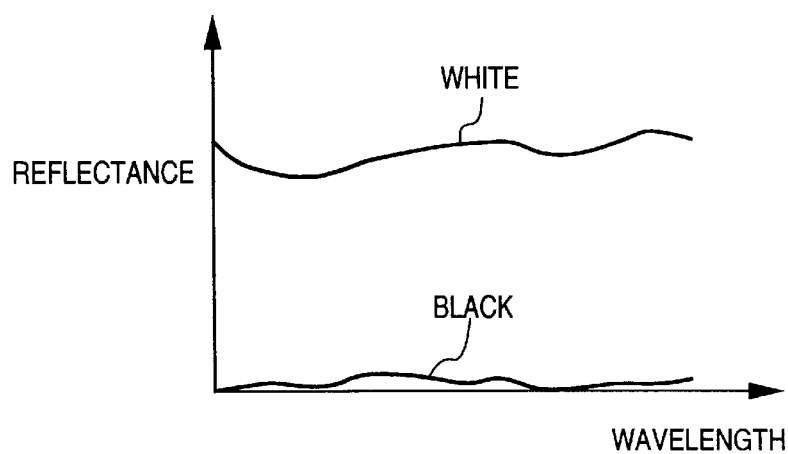
FIG. 14 is a graph showing the spectral reflectance of an original and the spectral reflectance of a black ink.
Figure 15:
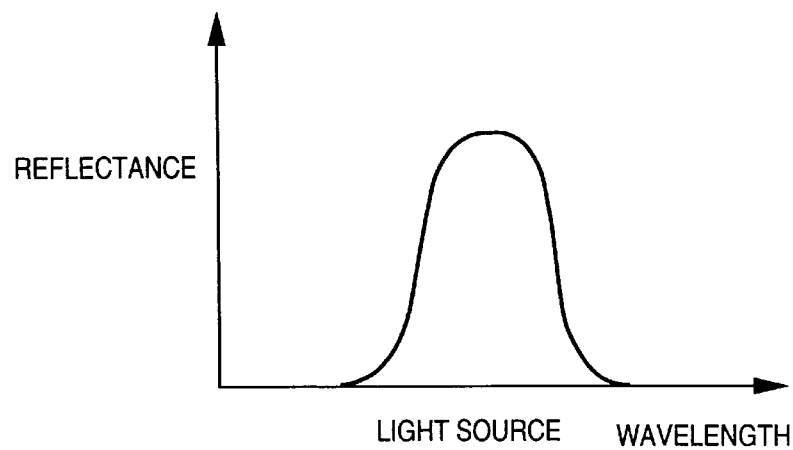
FIG. 15 is a graph showing the spectral characteristics of illumination light for forming an image of the original from which the green component is removed.
Figure 16:
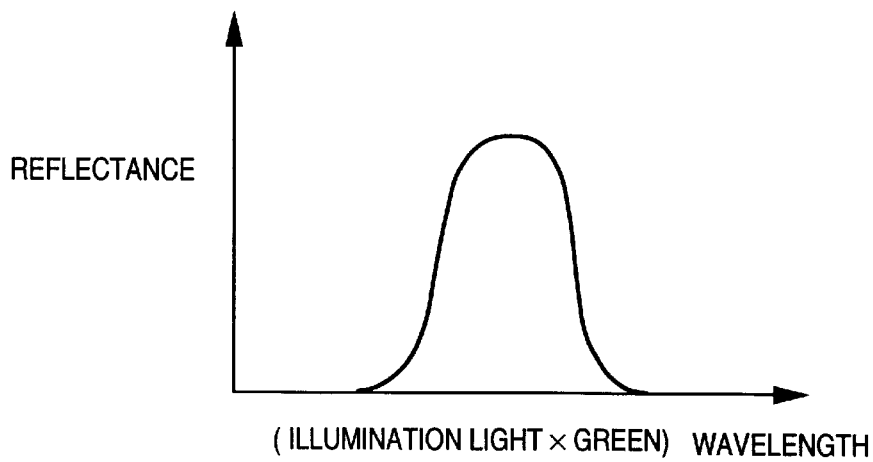
FIG. 16 is a graph showing the reflectance characteristics of a green portion of the original, which are obtained when the display device is caused to emit illumination light having the spectral characteristics of the green component.
Figure 17:
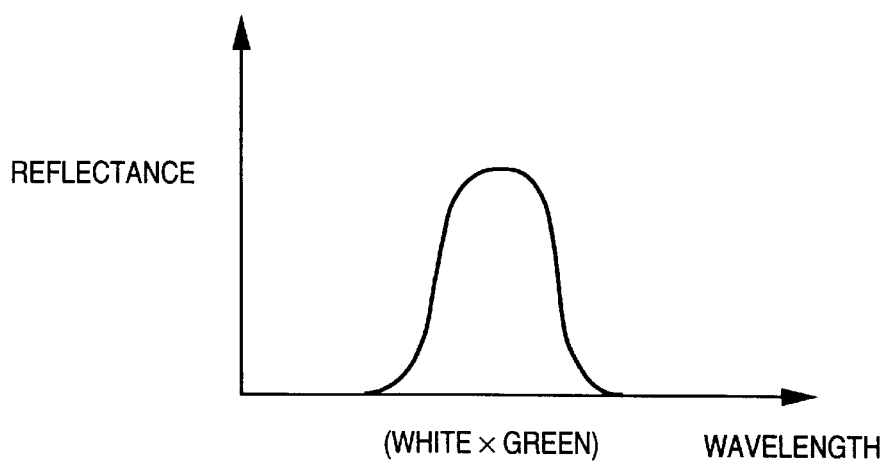
FIG. 17 is a graph showing the spectral distribution showing the reflectance of a paper portion.
Figure 18:
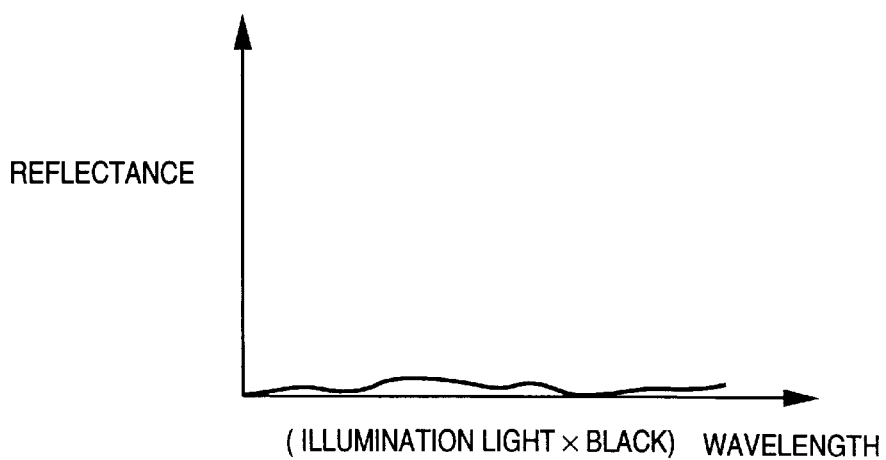
FIG. 18 is a graph showing the spectral distribution of the original portion with respect to the illumination light having the spectral characteristics of the green component.

FIG. 13 is a graph showing the spectral reflectance of a green component. FIG. 14 is a graph showing the spectral reflectance of a paper sheet (original) as an object and the spectral reflectance of a black ink. When illumination light (having characteristics shown in FIG. 15) having the spectral characteristics of a green component is irradiated from the liquid crystal display device 112 of the display unit 109 on this paper sheet, a reflectance as shown in FIG. 16 is obtained at the green portion, and spectral distributions as shown in FIGS. 17 and 18 are observed at the original portion and at the black portion, respectively. That is, the green portion has the same spectral distribution as that of the paper portion, so the colors cannot be distinguished. Therefore, when the image of the paper sheet (original) is sensed, and green is converted into white by color temperature conversion, an image obtained upon removing the green component from the original can be formed.

As described above, according to the fourth embodiment, an image obtained upon removing the green component from the original can be formed. In this embodiment, the green component is removed from the original. However, a color component to be removed can be arbitrarily selected by controlling the display unit 109, as a matter of course. In addition, the luminance correction unit must cause light emission while gradually darkening the light from the upper portion to the lower portion of the display screen, as shown in FIG. 19, such that the original is illuminated at a uniform illuminance. With this operation, the luminance of the display image near the object 114 decreases while that far from the object 114 increases. As a result, the object 114 is illuminated at a uniform illuminance. Alternatively, in consideration of a decrease in light amount of the photographing lens, the image as shown in FIG. 11 may be synthesized with the image shown in FIG. 19.

In this embodiment, a liquid crystal is used for a display device. However, a display device which emits light by itself, such as a CRT, may also be used.

As described above, according to the second to fourth embodiments, in an image sensing apparatus which photographs an object by an image sensing unit having an optical system and an image sensing element and reproduces the image on a standard display unit, the display device of the display unit is used to illuminate the object as a photographing target. With this arrangement, by appropriately setting the display color and luminance of the display device, the display device can be used as an illumination lamp without using any additional illumination means. Therefore, the cost and weight of the apparatus can be reduced.

In the third embodiment, the image sensing unit 108 and the display unit 109 are coupled to each other through the parallel link mechanism capable of changing the distance between the image sensing unit 108 and the display unit 109. With this arrangement, the distance between the object and the image sensing unit, and additionally, the relative position therebetween can be freely changed.

According to the above embodiments, a light emission type display device or a display device having a light-emitting element is used. With this arrangement, no additional element or unit for obtaining illumination light is needed, and the display device can be used as a surface emission type illumination source.

According to the third and fourth embodiments, when the display device is to be used as an illumination source for illuminating the object, a luminance distribution correction means is arranged to determine the luminance distribution of the display device in accordance with the peripheral light amount of the photographing lens of the image sensing unit. With this arrangement, even when the peripheral light amount of the photographing lens decreases, correction can be performed on the light emission side. Therefore, no expensive photographing lens is needed so that the product cost can be decreased.

In the third and fourth embodiments, the luminance distribution correction means causes the entire surface of the display device of the display unit to emit light at a uniform level. This light is photographed by the image sensing unit, thereby correcting the display luminance distribution of the display device such that an image output at a uniform level can be obtained from the image sensing unit. With this arrangement, appropriate correction can be performed in units of photographing lenses so that the influence of a decrease in peripheral light amount of the photographing lens can be eliminated.

In the third and fourth embodiments, the display unit has a color correction means for arbitrarily setting the light emission color of the display device. With this arrangement, the same effect as in the photographing operation using a color filter can be obtained so that a work according to the taste of the user can be obtained.

In addition, the color correction means has a function of displaying an image on the display device in accordance with a signal representing a desired light emission color level on the photographed image and converting the color temperature of the photographed image with this arrangement, the color temperature of the photographed image can be arbitrarily converted.

When a color component in the object is to be removed from the photographed image, the color correction means can display an image in a similar color as the color component to be removed on the display device, thereby illuminating the object. With this arrangement, a specific color on the object can be erased from the photographed image so that an arbitrary color component can be removed from the image.

(Fifth Embodiment)

Figure 20:
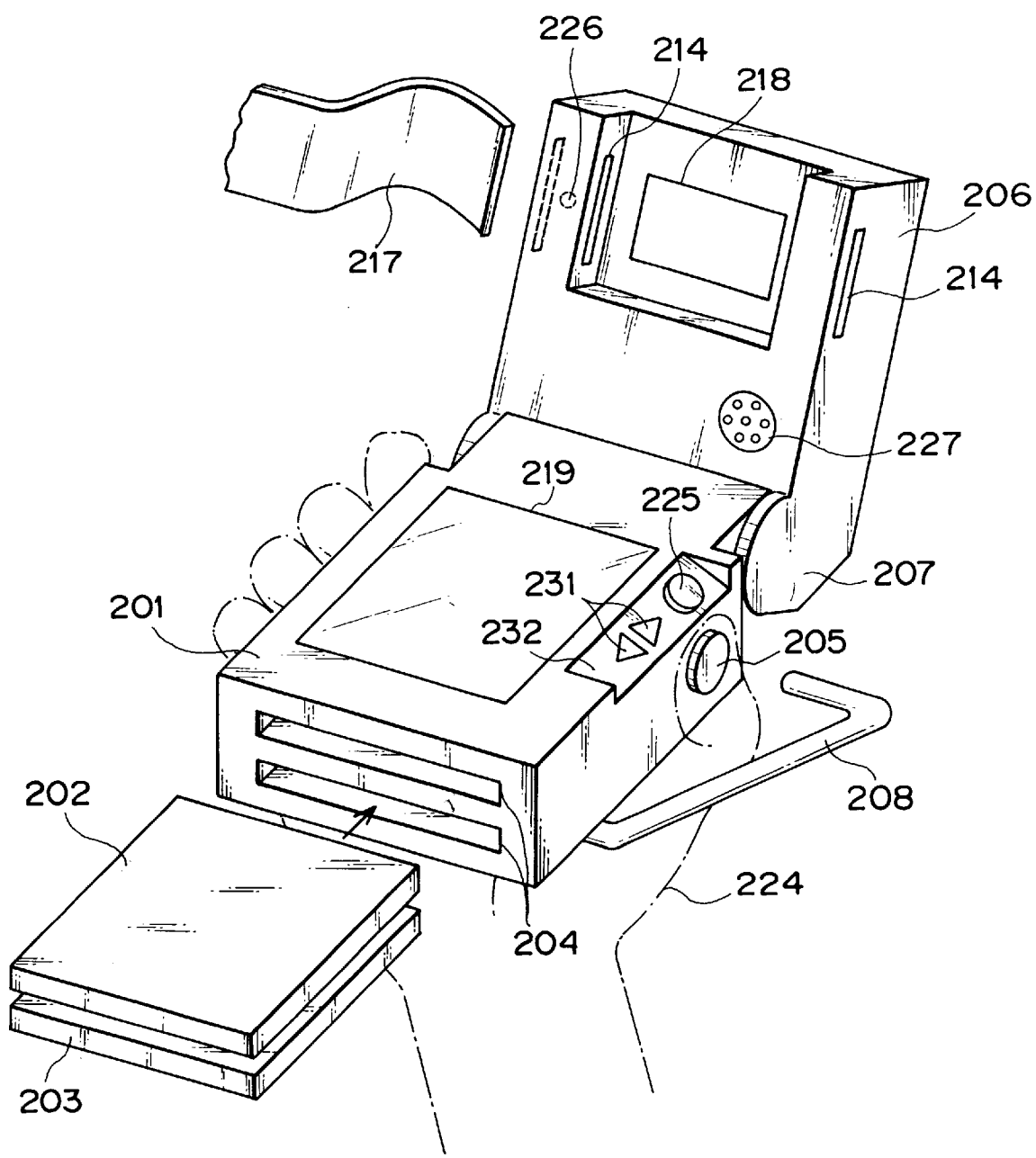
FIG. 20 is a perspective view of an information recording/reproducing apparatus according to the fifth embodiment.

FIG. 20 is a perspective view of an information recording/reproducing apparatus according to the fifth embodiment. Referring to FIG. 20, reference numeral 201 denotes a display unit having a liquid crystal display element for reproducing a video signal (to be described later); and 219, a display window. A recording unit 202 for recording a video signal and a power supply unit 203 for supplying power to the entire apparatus have a card-like flat shape. The recording unit 202 and the power supply unit 203 are mounted in mounting ports 204. A release button 205 is used to execute a photographing operation.

An image sensing unit 206 in which an image sensing element and a photographing optical system (to be described later) are loaded is pivotally fixed to the display unit 201 through a hinge 207. An arm member 208 can hold the display unit 201 at an arbitrary angle with respect to a plane such as a table. The arm member 208 is pivotally fixed to the display unit 201, and in an unused state, accommodated in the display unit 201. A slit 214 fixes a film 217 in front of the photographing optical system. A first photographing window 218 guides object light to the photographing optical system, and a second photographing window is arranged on the opposite side. A mode select button 225 is used to switch between two modes, i.e., between a photographing mode for performing the photographing operation and a reproduction mode for reproducing stored video information.

A detection unit 226 detects that the film 217 is inserted to the slit 214. A microphone 227 converts a speech signal into an electrical signal. Since the display unit 201 has a width enough to be held by a human hand 224, which is indicated by a dotted line, the entire display unit 201 can be held by the hand 224. In addition, since the display unit 201 has a sufficient weight with respect to the image sensing unit 206, this apparatus can be stably held. Furthermore, the display unit 201 need not be firmly gripped so that the apparatus can be easily held.

A select button 231 is used to select an AE mode such as shutter speed priority or an aperture priority in the photographing mode, or select video information to be reproduced in the reproduction mode.

As described above, the apparatus can be held without being firmly gripped by the hand 224, the mode select button 225 and the select button 231 can be easily operated with the thumb of the hand 224. In this embodiment, the mode select button 225 and the select button 231 are arranged on a surface 232 inclined with respect to a surface of the display unit 201, where the display window 219 is present, so that these buttons can be further easily operated.

Figure 21:
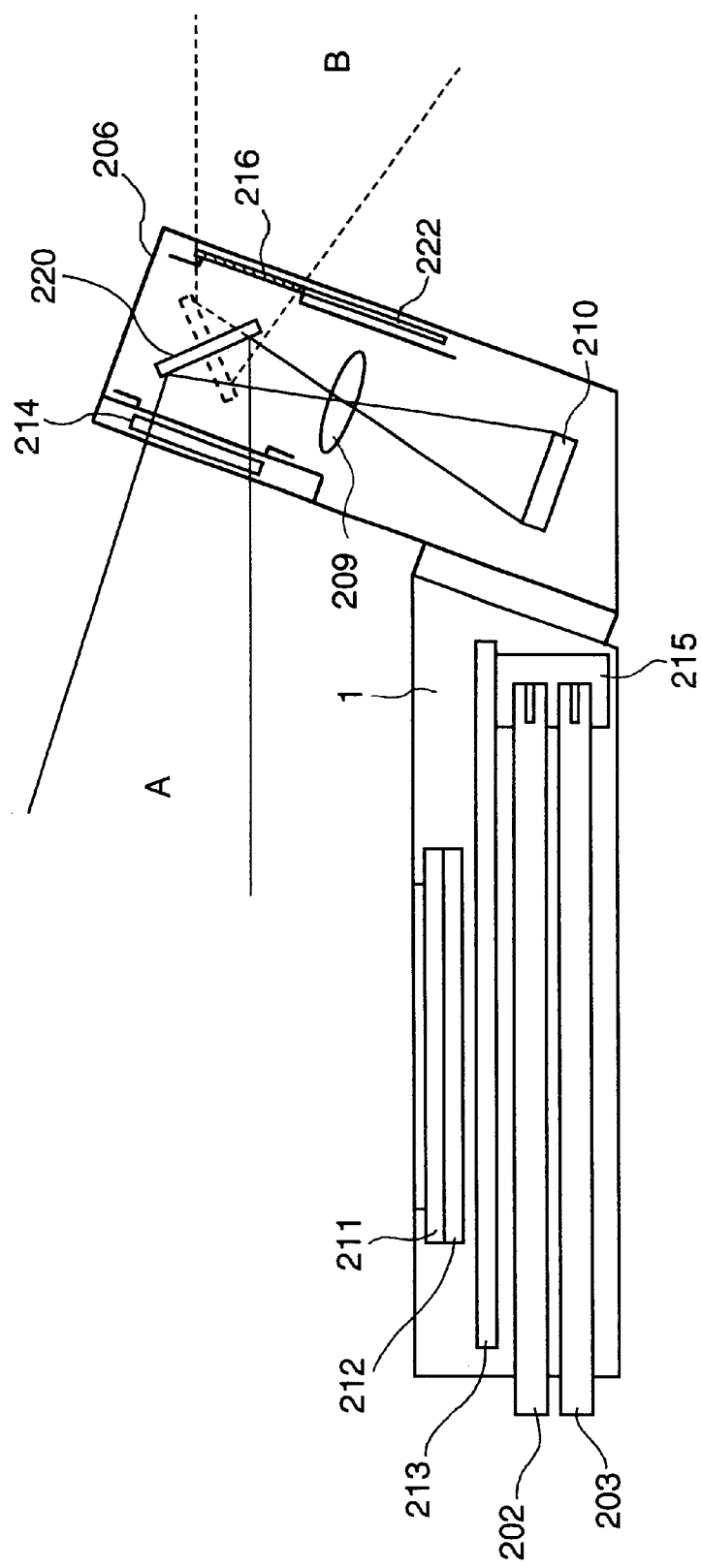
FIG. 21 is a sectional view of the information recording/reproducing apparatus shown in FIG. 20.

FIG. 21 is a sectional view of the information recording/reproducing apparatus shown in FIG. 20.

Referring to FIG. 21, reference numeral 209 denotes a photographing optical system. A mirror 220 has reflecting surfaces on both the upper and lower surfaces and is pivotally held by a pivotal portion (not shown). Therefore, when the mirror 220 is pivoted, the photographing direction of the photographing optical system 209 can be switched between a film photographing side A and an opposite side B. An image sensing element 210 converts an object image formed by the photographing optical system into an electrical signal.

A liquid crystal display element 211 displays a video signal obtained by the image sensing element 210. A backlight 212 illuminates the liquid crystal display element 211.

A driving circuit 213 drives the liquid crystal display element 211 and the backlight 212. A connector 215 electrically connects the recording unit 202 to the power supply unit 203.

A light-shielding member 216 shields light to the photographing window in the direction B. The lightshielding member 216 retreats from the photographing window to a retreat space 222. When a detection unit (not shown) detects that the light-shielding member 216 retreats, the mirror 220 is rotated by a driving unit (not shown) to a position indicated by a dotted line, so that the photographing operation in the photographing direction B is enabled. In this case, when the photographing direction A is selected, the photographer in front of the apparatus can be photographed. When the photographing direction B is selected, an object other than the photographer can be photographed. An object image formed on the image sensing element 210 in the photographing direction A is reversed to that in the photographing direction B. Therefore, taking this phenomenon into consideration, the read direction of the image sensing element 210 is changed.

Figure 22:
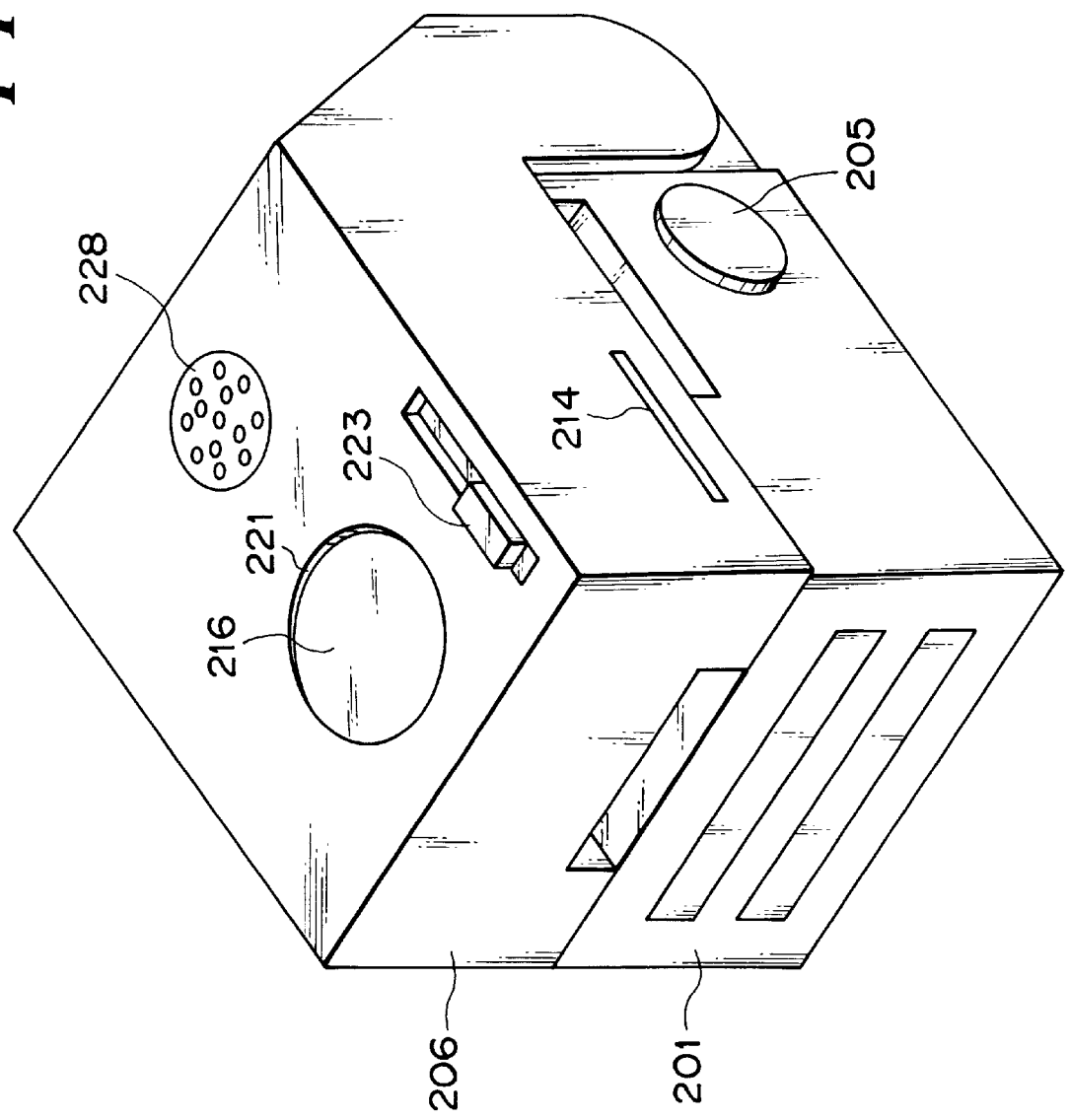
FIG. 22 is a perspective view of the information recording/reproducing apparatus shown in FIG. 20 in an unused state.

FIG. 22 is a perspective view showing an unused state of the information recording/reproducing apparatus shown in FIG. 20.

Referring to FIG. 22, reference numeral 221 denotes a photographing window in the direction B; 223, a slide lever for retreating the light-shielding member 216 from the photographing window 221; and 228, a microphone for converting a speech signal into an electrical signal in the photographing operation through the photographing window 221 in the direction B.

In this state, the image sensing unit 206 covers the liquid crystal display element 211 of the display unit 201. For this reason, the liquid crystal display element 211 can be protected from an external shock. When the image sensing unit 206 is folded as shown in FIG. 22, a power switch (not shown) is turned off to cut power supply from the power supply unit 203. With this arrangement, the power supply can be prevented from being kept on.

The operation of the apparatus with the above arrangement will be described below.

The image sensing unit 206 in the accommodated state shown in FIG. 22 is pivoted about the hinge portion 207 and set in the state shown in FIG. 20. When the angle between the image sensing unit 206 and the display unit 201 exceeds a predetermined value, the power switch is turned on, and power is supplied from the power supply unit 203 to the respective units. If the photographing mode is selected by the mode select button 225, the image sensing unit 206 and the display unit 201 are driven, and video information obtained by the image sensing unit 206 is displayed on the liquid crystal display element 211 of the display unit 201. This video information can be recorded in the recording unit 202 by operating the release button 205. The AE mode can be changed by operating the select button 231.

As for speech information, if the photographing direction A is selected, a speech signal obtained by the microphone 227 is recorded. If the photographing direction B is selected, a speech signal obtained by the microphone 228 is recorded. Such a speech signal can be recorded together with a video signal by operating the release button 205. Note that a mode for recording only a speech signal may be provided.

When the film 217 is mounted in the slit 214, and the detection unit 226 detects that the film is mounted, the photographing optical system 209 is set at a predetermined zoom magnification for photographing the entire frame of the film, and a focusing lens (not shown) is driven such that the position of the film 217 is focused. By operating the release button 205, the film 217 is photographed. In this embodiment, the film is fixed in the slit 214 and photographed. However, in addition to a film, any other object having a sheet-like shape such as a name card can be photographed, as a matter of course.

Figure 23:
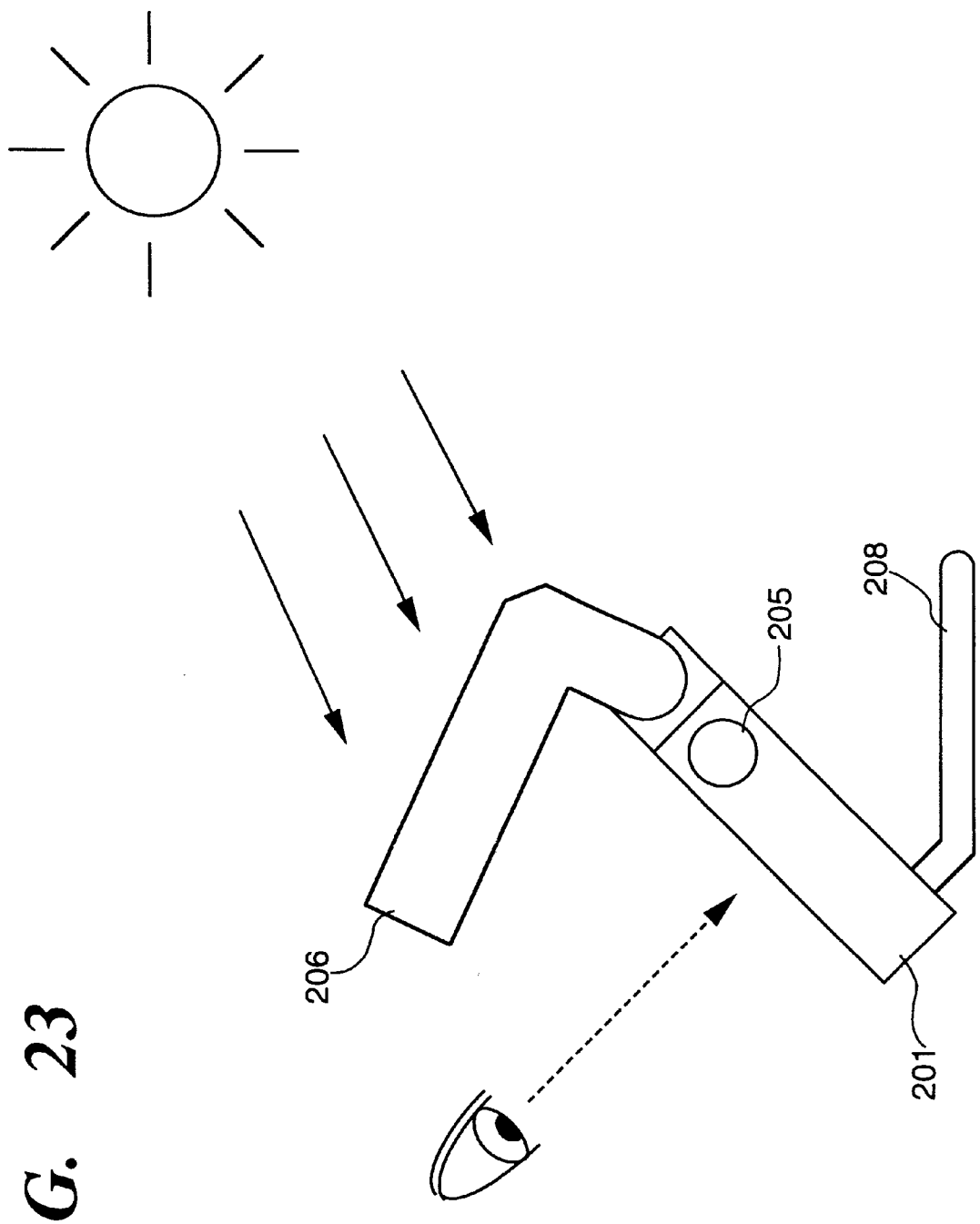
FIG. 23 is a view showing the form of outdoor use of the information recording/reproducing apparatus shown in FIG. 20.
Figure 24:
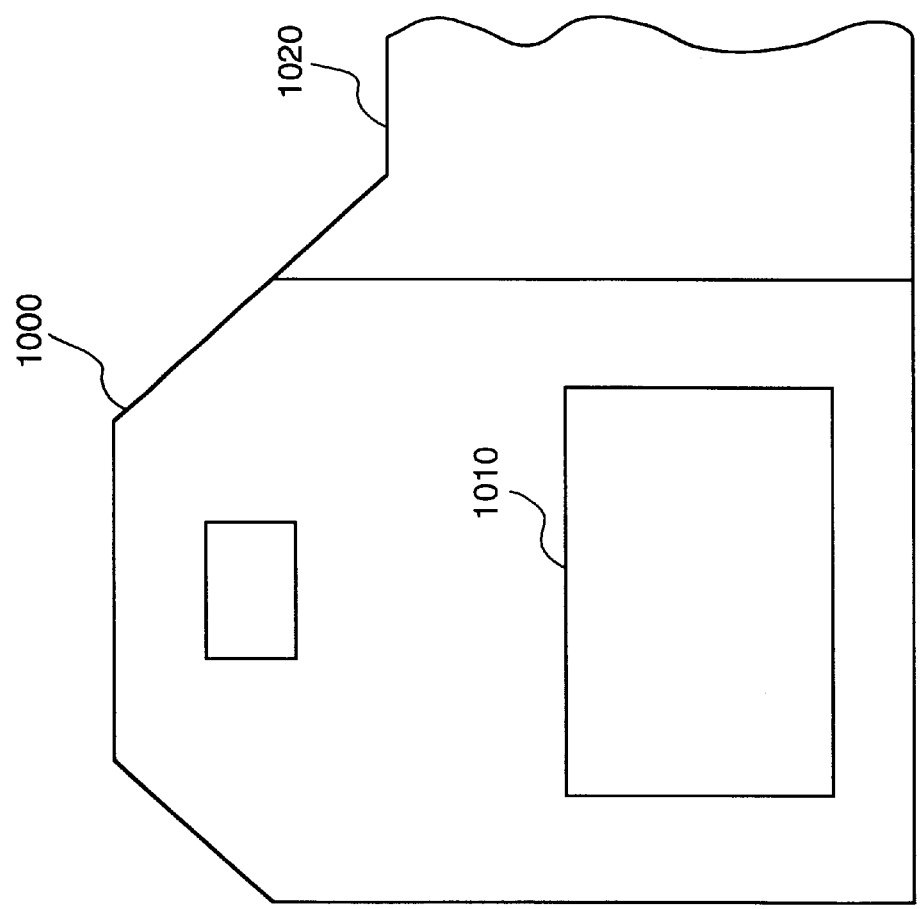
FIG. 24 is a view schematically showing a general information recording/reproducing apparatus.

When the display mode is selected by the mode select button 225, only the display unit 201 is driven so that image data is read out from the recording unit 202, and video information is displayed on the liquid crystal display element 211. When video information is to be reproduced outdoors, as in FIG. 23 showing the form of outdoor use, the image sensing unit 206 serves as a visor for preventing the liquid crystal display element from being directly irradiated with a sum beam. In addition, the apparatus can be placed on a table or the like while the display unit 201 is held at an arbitrary angle by the arm member 208. At this time, by operating the select button 231, video information to be displayed can be changed.

As described above, according to the fifth embodiment, a satisfactory view of the display surface of the liquid crystal display element 211 can be obtained even outdoors. In addition, when the image sensing unit 206 is folded on the display unit 201 side, the power supply of the information recording apparatus is turned off. Therefore, the power supply can be prevented from being kept on in a nonphotographing state.

Since switching between the photographing directions A and B is performed by rotating the mirror 220, switching between the photographing directions A and B can be easily performed.

Holding and operations of the apparatus are also facilitated. Particularly, since the mode select button 225 and the select button 231 are arranged on the inclined surface 232 of the display unit 201, the mode select button 225 and the select button 231 can be easily operated with the thumb of a hand holding the display unit 201.

In this embodiment, the apparatus is held by a right hand. To hold the apparatus by a left hand, the operation members such as the release button must be arranged at opposite positions, as a matter of course.

As described above, according to the fifth embodiment, an information recording/reproducing apparatus having a display unit capable of displaying at least video information is held while a surface of a housing accommodating the display unit, which is arranged on the opposite side of a surface where the display unit is present, is in contact with the hand of the user who is holding the housing. With this arrangement, the information recording/reproducing apparatus can be easily held without being firmly gripped, so the user is not tired. Even when this arrangement is applied to an apparatus dedicated to display information, such as a compact liquid crystal television, the same effect as described above can be obtained.

According to the fifth embodiment, an information recording/reproducing apparatus having a recording unit for recording at least video or speech information and a display unit for displaying the video information is held while the rear surface of a housing accommodating the display unit is in contact with the hand of the user who is holding the housing. With this arrangement, the apparatus can be easily held without being firmly gripped, so the user is not tired even in a long-time photographing operation.

According to the fifth embodiment, the release button for designating the start of recording of video or speech information or the start of reproduction (display) of video information is arranged to be operable with the thumb of a hand of the user who is holding the housing accommodating the display unit. With this arrangement, the operability is improved. The release button may be operated with another finger other than the thumb.

According to the fifth embodiment, the operation buttons except for the release button are arranged on the surface inclined with respect to the display surface of the display unit to be operable with the thumb of a hand of the user who is holding the housing accommodating the display unit. With this arrangement, the operability is further improved.

According to the fifth embodiment, in an information recording/reproducing apparatus having an image sensing unit and a display unit, the image sensing unit is fixed to freely pivot about a rotating shaft arranged at one end of the display unit. With this arrangement, the image sensing unit can be used as a visor for the display unit so that a satisfactory view of a displayed content can be obtained even outdoors.

According to the fifth embodiment, the rotating shaft is arranged at the upper end of the display unit along the longitudinal direction. With this arrangement, the angle can be adjusted to obtain a satisfactory view of display on the display unit even in a photographing operation.

According to the fifth embodiment, the image sensing unit can be folded to shield the display surface of the display unit. With this arrangement, the display surface can be protected.

According to the fifth embodiment, a positioning unit for holding a sheet-like object such as a film is provided in front of the photographing optical system of the image sensing unit. With this arrangement, a sheet-like object can be easily photographed.

According to the fifth embodiment, a detachment mechanism for attaching/detaching the recording unit for recording a video signal obtained by the image sensing unit and the power supply unit for supplying power to the apparatus to/from the display unit are arranged. The recording unit and the power supply unit are mounted such that the flat surfaces are stacked substantially parallel to the display surface of the display unit. With this arrangement, the display unit can be made compact.

According to the fifth embodiment, an angle adjustment unit capable of holding the display unit at an arbitrary angle with respect to the horizontal plane is arranged. With this arrangement, even when the information recording/reproducing apparatus is placed on a table or the like, the angle of the display screen with respect to the user can be adjusted, so that a satisfactory view of the display screen can be obtained.

According to the fifth embodiment, the photographing optical system of the image sensing unit is constituted by a zoom optical system capable of changing the photographing magnification, and a holding unit for holding or positioning a sheet-like object such as a film in front of the photographing optical system, and a detection unit for detecting that the object is held or positioned are arranged in front of the zoom optical system. When the detection unit detects the object, the photographing optical system is set at a predetermined zoom magnification. With this arrangement, the user can easily photograph the sheet-like object by a simple operation, i.e., only by setting the sheet-like object and depressing the release button.

According to the fifth embodiment, the image sensing unit has a pivotal incident light reflection unit so that incident light from both the first photographing window and the second photographing window on the opposite side can be handled. With this arrangement, an object in front of the image sensing unit and another object behind the image sensing unit can be photographed.

According to the fifth embodiment, when the image sensing unit is folded on the display unit side, the power supply is turned off. With this arrangement, the power supply can be prevented from being kept on in a non-photographing state.

As many apparently widely different embodiments of the present invention can be made without departing from the spirit and scope thereof, it is to be understood that the invention is not limited to the specific embodiments thereof except as defined in the claims.

What is claimed is:

1. An image sensing apparatus comprising:

image sensing unit having a window, an optical system and an image sensing element for converting an optical image formed by said optical system into an electrical signal;

display unit for displaying an image to a user on the basis of the electrical signal output from said image sensing unit; and coupling unit for coupling a first housing accommodating said image sensing unit to a second housing accommodating said display unit, both of which are free to pivot about a rotating shaft, said second housing having a lateral proximal edge and a lateral distal edge, said proximal edge being oriented closer to the user than the distal edge during operation of said apparatus, said shaft being oriented along said distal edge, and said first housing capable of rotating about said shaft so that said window in said image sensing unit confronts said second housing.

2. The apparatus according to claim 1, wherein said rotating shaft of said coupling unit is arranged at an upper end portion of a surface where a display surface of said display unit in said second housing is arranged.

3. the apparatus according to claim 1, wherein said coupling unit forms a state wherein said first housing shields a display surface of said display unit when said first housing and said second housing are folded about said rotating shaft.

4. The apparatus according to claim 1, wherein said image sensing unit comprises a holding unit for holding a film in front of said optical system.

5. The apparatus according to claim 4, wherein said image sensing unit has a pivotally held incident light reflection unit, said window being on a side where the film is photographed, and a second window arranged on an opposite side of said window.

6. The apparatus according to claim 1, further comprising angle holding unit for holding a display surface of said second housing at an arbitrary angle with respect to a plane when said image sensing apparatus is placed on said plane.

7. The apparatus according to claim 1, wherein said image sensing unit has a zoom optical system capable of changing a photographing magnification, a holding unit for holding a film in front of said zoom optical system, and a detection unit for detecting that the film is held by said holding unit, and when said detection unit detects that the object is held by said holding unit, said zoom optical system is set at a predetermined zoom magnification.

8. The apparatus according to claim 1, further comprising power supply control unit for turning on/off power supply to said image sensing apparatus in accordance with an angle formed between said first housing and said second housing.

9. The apparatus according to claim 1, further comprising operation switches arranged to be operable with a finger of one hand while said second housing is held by the hand contacting surface of said housing, which is arranged on an opposite side of a surface where a display surface of said display unit is present.

10. The apparatus according to claim 9, wherein said operation switches include a release button for designing a start of a photographing operation by said image sensing unit.

11. The apparatus according to claim 10, wherein said second housing has a surface inclined with respect to said display surface, and some of said operation switches are arranged on said inclined surface.

* * * * *

UNITED STATES PATENT AND TRADEMARK OFFICE
CERTIFICATE OF CORRECTION

PATENT NO. : 6,339,447 B1
DATED : January 15, 2002
INVENTOR(S) : Sunao Kurahashi et al.

It is certified that error appears in the above-identified patent and that said Letters Patent is hereby corrected as shown below:

<u>Title page,</u>
Item [30], Foreign Application Priority Data, the filing date of the fourth priority document should read -- June 14, 1995 --

<u>Column 4,</u>
Line 57, "di splay device." should read -- display device. --

<u>Column 5,</u>
Line 9, "correct ion means" should read -- correction means --

<u>Column 16,</u>
Line 60, "image with this" should read -- image. With this --

Signed and Sealed this

Tenth Day of September, 2002

Attest:

JAMES E. ROGAN
*Attesting Officer*   *Director of the United States Patent and Trademark Office*

UNITED STATES PATENT AND TRADEMARK OFFICE
CERTIFICATE OF CORRECTION

PATENT NO. : 6,339,447 B1
DATED : January 15, 2002
INVENTOR(S) : Sunao Kurahashi et al.

It is certified that error appears in the above-identified patent and that said Letters Patent is hereby corrected as shown below:

<u>Title page,</u>
Item [56], References Cited, FOREIGN PATENT DOCUMENTS, delete
"JP        40553448        *        6/1993        H04N/5/225"

Signed and Sealed this

Tenth Day of June, 2003

JAMES E. ROGAN
*Director of the United States Patent and Trademark Office*